United States Patent [19]
Farrar, Jr. et al.

[11] Patent Number: 6,122,671
[45] Date of Patent: Sep. 19, 2000

[54] MOBILE COMMUNICATIONS FROM COMPUTER AIDED DISPATCH SYSTEM VIA A CUSTOMER PREMISES GATEWAY FOR SATELLITE COMMUNICATION SYSTEM

[75] Inventors: Samuel A. Farrar, Jr., Reston; Joseph A. Gruessing, Jr., Ashburn, both of Va.

[73] Assignee: AMSC Subsidiary Corporation, Reston, Va.

[21] Appl. No.: 09/100,775

[22] Filed: Jun. 8, 1998

Related U.S. Application Data

[63] Continuation of application No. PCT/US96/19906, Dec. 6, 1996.
[60] Provisional application No. 60/008,325, Dec. 8, 1995.

[51] Int. Cl.⁷ .............. G06F 13/42; G06F 13/14; G06F 15/17; H04J 3/02
[52] U.S. Cl. .............. 709/238; 709/224; 709/204; 370/913
[58] Field of Search .............. 709/249, 204, 709/225, 224, 227, 238; 370/401, 903, 913

[56] References Cited

U.S. PATENT DOCUMENTS

| | | |
|---|---|---|
| 4,926,495 | 5/1990 | Comroe et al. . |
| 5,210,753 | 5/1993 | Natarajan . |
| 5,222,064 | 6/1993 | Sagawa . |
| 5,329,618 | 7/1994 | Moati et al. . |
| 5,519,834 | 5/1996 | Kamerman et al. . |
| 5,606,668 | 2/1997 | Shwed . |
| 5,606,669 | 2/1997 | Bertin et al. . |
| 5,956,024 | 9/1999 | Strickland et al. . |
| 6,049,828 | 4/2000 | Dev et al. .............. 709/224 |
| 6,052,711 | 4/2000 | Gish .............. 709/227 |
| 6,052,725 | 4/2000 | McCann et al. .............. 709/227 |

*Primary Examiner*—Mark H. Rinehart
*Attorney, Agent, or Firm*—Irah H. Donner; Hale and Dorr LLP

[57] ABSTRACT

A mobile satellite system includes a satellite communication switching office having a satellite antenna for providing communication of satellite messages via a satellite. The mobile satellite system also includes a mobile communication system transmitting to and receiving messages from the mobile satellite system, and a computer aided dispatch (CAD) system sending to and receiving customer messages from the mobile communication system via the mobile satellite system. A central controller controls communication in the mobile satellite system. A customer premises gateway (CPG) system provides an interface between the CAD system and the central controller, enabling the mobile communication system to transmit the messages to the CAD system and enabling the CAD system to transmit the customer messages to the mobile communication system.

15 Claims, 17 Drawing Sheets

MOBILE COMMUNICATIONS FROM COMPUTER AIDED DISPATCH SYSTEM VIA A CUSTOMER PREMISES GATEWAY FOR SATELLITE COMMUNICATION SYSTEM

RELATED APPLICATIONS

This application is a continuation of the International Application number PCT/US19906 filed Dec. 6, 1998 which claims priority from U.S. Provisional Application No. 60/008,325 filed Dec. 8, 1995 entitled "CUSTOMER PREMISES GATEWAY", both of which are incorporated herein by reference.

FIELD OF THE INVENTION

The present invention relates to mobile communications in wireless communication systems. More specifically, the present invention relates to mobile communications from customer applications including computer aided dispatch (CAD) systems via a customer premises gateway (CPG). The CAD sends and receives pre-formatted text and binary messages to a central facility via the CPG using a satellite communication system.

DESCRIPTION OF THE RELATED ART

Wireless communications terminals have been used in service vehicles to receive communications messages from centralized dispatcher offices. For example, taxicab companies have installed data terminals in taxicabs that receive messages from a dispatcher via RF transmission. Such systems, however, are limited in their communication abilities in that the mobile terminals can only receive and acknowledge messages.

One example of a currently successful and operational satellite based data service is INMARSAT's Standard-C Communications System. The major elements of the Standard-C system architecture include land or coast earth stations (LESs or CESs), and a network coordination station (NCS) in each ocean region and ship or mobile earth stations (SESs or MESs). Each CES serves as a gateway between the terrestrial network and the INMARSAT Standard-C communications system. The types of interface provided at the CES are decided by the coast earth station operator, however, Telex, EGC message processing and distress message handling are mandatory to comply with INMARSAT's Standard Definition Manual Version 1.3.1.

A SES or MES is the mobile earth station used by mobile subscribers. The system allows the use of very low G/T transceivers at the ship or mobile earth station (SES or MES). Standard-C uses all digital transmission techniques for both signalling and message data specifically based on a standard slotted ALLOHA TDMA protocol. SES equipment may therefore take advantage of the low cost trend of digital technology. Standard-C SESs do not require the use of a dedicated receiver for receiving signalling information.

The SES consists of a DCE (data circuit terminating equipment) providing the interface to the satellite network, and a DTE (data terminal equipment, for example a personal computer) which provides the user interface. For ship-to-shore message transfer, a message is formatted in the DTE and then transferred to the DCE for transmission. In the shore-to-ship direction, the DCE receives the complete message from the radio channel before passing it to the DTE for the attention of the user. The SES may be equipped for reception of Enhanced Group Calls (EGC) or a separate Receive Only Terminal for EGC reception may be used.

When idle, every SES tunes to and receives a TDM channel transmitted by the NCS; the NCS Common Channel. The channel is used to transmit announcements to SESs that shore-to-ship calls are ready at a CES for transmission to the SES. Enhanced Group Calls are also transmitted on this channel.

Additional optional services are available within the system and may be offered by CESs. These services include access to electronic mail and message handling services (X.400 for example), individual, group and area directed polling, and a data reporting service. The polling and data reporting services are primarily aimed at providing a service to remotely operated and land mobile terminals. More detailed information regarding the Standard-C protocol is disclosed in "INMARSAT Standard-C Communications System" by Kevin Phillips, IEEE International Conference on Communications '88: Digital Technology—Spanning the Universe, Jun. 12–15, 1988, pp. 1117–1122 (Available from IEEE Service Cent (cat. #CH2538-7/88)) ©1988 IEEE, the disclosure of which is incorporated in its entirety by reference.

Standard-C protocol was not designed to be used in connection with land mobile data terminals but was designed only for maritime use. In addition, Standard-C was not designed for use or integration with computer aided dispatch applications. Thus, there is a need for a satellite communications system that provides effective communications for land mobile data terminals for use or integration with a computer aided dispatch application.

Conventional electronic mail and message handling services are not designed for extensive message transmissions in a satellite communication system. Service vehicles such as taxicabs, trucks, etc., need an efficient, low-cost, and reliable arrangement for receiving messages from a central dispatcher. Moreover, there is a need for providing advanced messaging capabilities where a variety of messages can be initiated by mobile terminals without providing excessive loading on the satellite.

Further, there is a need for providing advanced messaging capabilities where a variety of messages can be initiated by computer aided dispatch applications for effectively and efficiently controlling groups of mobile terminals. The initiation of messages via the computer aided dispatch application will also result in effective and efficient controlling fleets of vehicles.

DISCLOSURE OF THE INVENTION

In view of the foregoing, there a feature and advantage of the present invention is in a low cost mobile communication system that provides efficient transport of user messages via a satellite network.

Another feature and advantage of the present invention is in an electronic mail messaging system for transporting messages between a dispatcher and mobile communication terminals that uses predetermined message forms to minimize user efforts in generating and displaying mail messages.

Another feature and advantage of the present invention is in a satellite communications system that provides effective communications for land mobile data terminals for use or integration with a computer aided dispatch application.

Another feature and advantage of the present invention provides is advanced messaging capabilities where a variety of messages can be initiated by computer aided dispatch applications for effectively and efficiently controlling groups of mobile terminals.

According to at least one aspect of the present invention, a mobile satellite system includes a satellite communication switching office having a satellite antenna for providing communication of a satellite message with a mobile communication system via a satellite, and a central controller communicating with the mobile communication system via the satellite communication switching office.

The mobile satellite system includes a satellite communication switching office having a satellite antenna for providing communication of satellite messages via a satellite. The mobile satellite system also includes a mobile communication system transmitting to and receiving messages from the mobile satellite system, and a computer aided dispatch (CAD) system sending to and receiving customer messages from the mobile communication system via the mobile satellite system. A central controller controls communication in the mobile satellite system. A customer premises gateway (CPG) system provides an interface between the CAD system and the central controller, enabling the mobile communication system to transmit the messages to the CAD system and enabling the CAD system to transmit the customer messages to the mobile communication system.

According to another embodiment of the invention, a method of managing and transmitting the customer messages between the CAD system and the mobile satellite system is provided. The method includes the steps of supporting central controller communication services, satellite message communication services, and network management communication services, configuring middleware services for invocation, and receiving outbound messages from the CAD system, and formatting the outbound messages as application programmer interface (API) calls. The method also includes the steps of receiving inbound messages, interpreting the inbound messages, and delivering the inbound messages to the CAD system, invoking the middleware services via a library of middleware functions and the API calls, and performing message logging including logging control information. The method also includes the steps of interfacing with a physical transport medium of the CAD system, providing an interface between the CAD system and the central controller and providing the CAD system access to the mobile satellite system, and configuring access information for accessing the central controller.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BEST MODE FOR CARRYING OUT THE INVENTION

The present invention provides a mobile communication system that sends and receives electronic mail messages to and from other stations in a satellite communication system. The mobile communication system is designed to provide flexibility to users, while maintaining efficient terminal operations. The techniques described herein enable the mobile communication system to be implemented as a low-cost terminal requiring a minimal amount of memory. An overview of the overall satellite communication system and mobile communication system will be provided, followed by a more detailed description of the software interfaces and software functions of the mobile communication system.

The Mobile Messaging Service (MMS) Communications Software (MCS) provides the lower level network transport services to the End-Systems (ES) communicating with each other via the Mobile Messaging Service. The MCS provides services on the Mobile Communicator (AMC) application software so that it can communicate with a satellite modem and exchange data across the satellite network. These services include receiving messages from the application software and packaging them for delivery to the network, receiving data from the network and translating it into application messages, and providing services for the application to control and configure the transceiver.

Figure 1:
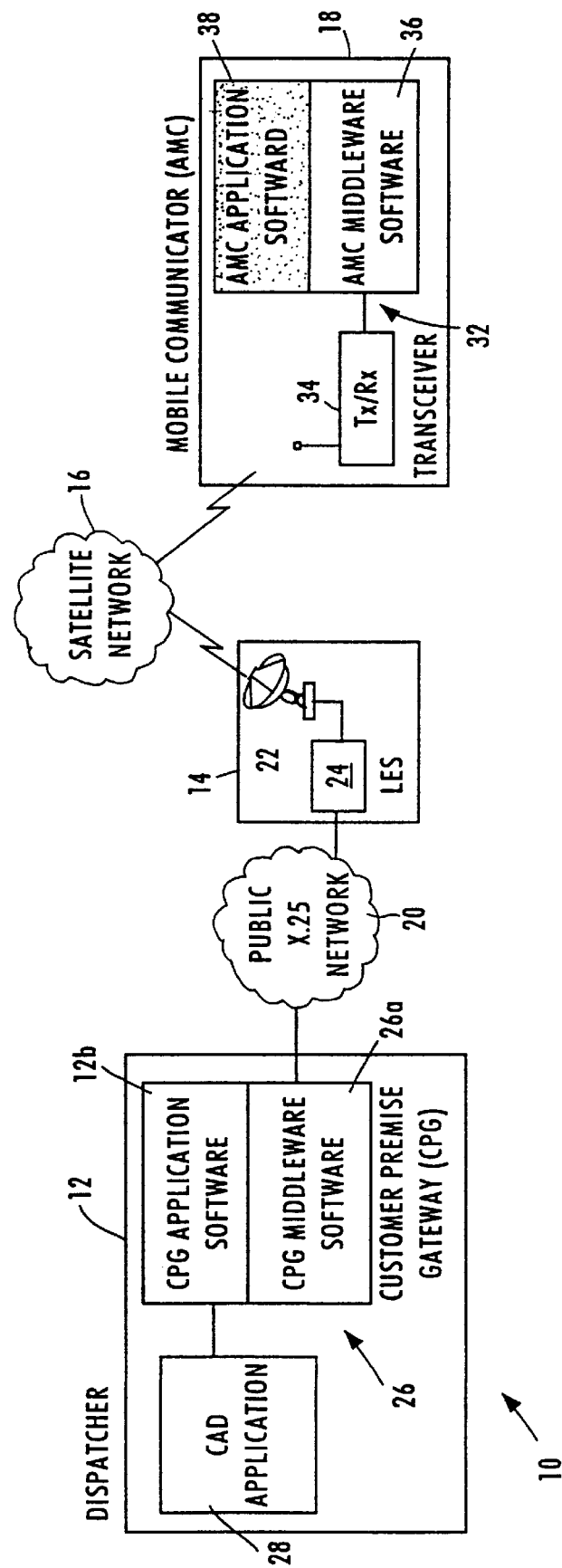
FIG. 1 is a diagram illustrating an architecture of a satellite communication system for a mobile communication system of the present invention.

On the Terrestrial side, the Communications Software provides services that allow Computer Aided Dispatch (CAD) applications to send and receive data from the Land Earth Station (LES). FIG. 1 illustrates a system configuration where the communications software servicing the terrestrial side communicates with the Customer Premises Gateway (CPG) application software so that it can access a Public X.25 network and then communicate via a satellite network. The required communications services include receiving messages from the customer applications and packaging them for delivery to the network, and receiving data packets from the network and translating them for use by the customer's CAD systems.

FIG. 1 is a diagram of a satellite communication system architecture in communication with the mobile communication system to provide the mobile messaging service (MMS) of the present invention. The satellite communication system 10 includes a dispatcher station 12, a satellite communication switching office 14, and a satellite network 16 for transporting satellite messages between the satellite communication switching office 14 and an adaptive mobile communication (AMC) system 18. The AMC is implemented, for example, as a communications device on vehicle, for example a truck. The dispatcher 12 is located at a customer premises, for example at a management office of a trucking company having a fleet of trucks. The dispatcher 12 sends and receives signals to and from the satellite communication switching office 14 via a leased communication line of a public packet switched network 20, for example a X.25 network.

The satellite communication switching office 14 includes a satellite antenna 22, and a land earth station (LES) 24 that interfaces between the satellite antenna 22 and the public X.25 network 20. Data packets carrying satellite messages received from the dispatcher 12 via the X.25 network 20 are reassembled by the LES 24, and transmitted to the satellite network 16, preferably using an enhanced satellite communications protocol that provides packet communications between the LES 24 and the AMC 32 without the necessity of additional earth stations to transmit signaling and control messages to the satellite network 16. The communications requirements for the enhanced satellite communications protocol of the preferred embodiment is described in more detail in commonly assigned, copending application Ser. No. 08/654,453, filed May 28, 1996, entitled IMPROVED COMMUNICATION PROTOCOL FOR SATELLITE DATA MESSAGING, the disclosure of which is incorporated in its entirety herein by reference. The communications protocol for the data terminal is described in more detail in commonly assigned, copending provisional application 60/011,158, filed Dec. 8, 1995, entitled MOBILE COMMUNICATOR PROTOCOL AND FEATURES, the disclosure of which is incorporated in its entirety herein by reference.

Satellite messages received from the mobile user via satellite network 16 by the LES have addresses identifying the recipient of the satellite message, described below. If the intended recipient is the dispatcher 12, the LES 24 transparently forwards the received message byte stream plus a header from the satellite network 16 to a customer premise gateway (CPG) 26 at the dispatcher 12 via the public X.25 network 20. The CPG 26 includes middleware software 26a that communicates with the LES 24 via the X.25 network 20. The CPG middleware 26a receives the byte stream from the X.25 network 20, reassembles the satellite message from the received byte stream, and presents the reassembled message to the CPG application software 26b. The CPG application software 26b converts the reassembled message into a format usable by a computer-aided-dispatcher (CAD) 28 resident at the dispatcher 12, and outputs the converted message to the CAD application 28.

The dispatcher 12 and AMC stations 18 communicate using proformas-template forms to be used by the sender and having data fields. The AMC stations 18 have the proformas stored in memory, described below. Exemplary proformas include stop-over form used to inform the dispatcher 12 of an overnight stay, including date, time, and address fields. The dispatcher 12 would receive record of the address where trucker will be staying that evening. Other proformas include free form (text message), dispatch request, service request, etc. Each proforma may also include an acknowledge field.

The proformas minimize the amount of data that needs to be transmitted over the satellite network 16 by transmitting a form identifier, and the binary data to fill in the form. Hence, there is no need for labels, screen positions, format commands, etc. to be sent, since each station can access the appropriate screen forms on the basis of the form identifier, and rebuild the original form display locally.

The computer-aided-dispatcher (CAD) application 28 provides the dispatching and e-mail messaging functions in a graphic user interface to enable a dispatcher to manage the fleet of mobile units. Proforma messages from the CAD application 28, described below, are converted and compressed by the CPG application software 26b from text data into a message carrying binary data. The message carrying binary data is then sent to the CPG middleware 26a software which converts the message to a byte stream for transmission to the LES 24 via the X.25 network 20.

The AMC 18 is the mobile component of the Mobile Messaging Service (MMS) and preferably includes an OMNIDATA RDT-3000 Data Terminal Equipment (DTE) 32 connected to a Data Communications Equipment (DCE) 34 compatible with the above-described enhanced satellite communications protocol. The DTE 32 includes middleware software 36 and application software 38 controlled by a 25 MHz Intel 386 or better microprocessor. According to the preferred embodiment, the application software 38 will execute on the DTE under DataLight's ROM-DOS Version 6.2 operating system, and will integrate with the Trimble Galaxy Inmarsat-C/GPS (for spot beam roaming) DCE 34. The middleware software 36 provides a communications protocol enabling communication between the transceiver and the CPG. An exemplary middleware software is the Enterprise Messaging Services (EMS), Ver. 3, by Complex Architectures, Inc., a Sybase Company, Wakefield, Mass.

The AMC 18 has a proforma definition file in non-volatile memory. Hence, the Dispatcher 12 can create new proformas and download them via satellite to the mobiles 18, where the mobiles would accept the new form definitions and store them in the proforma definition file.

As described below, a user of the AMC 18 sends a message by selecting a proforma, filling out the form with the appropriate information and pressing the send button. In response to the send button, the application software 38 converts and compresses the text data into a message carrying binary data. The message carrying binary data is then sent to the middleware software 36 which executes the communication functions, including controlling the transceiver 34. The middleware software supplies a byte stream of the mobile message to the transceiver, which transmits the byte stream to the LES via the satellite network.

Figure 2A:
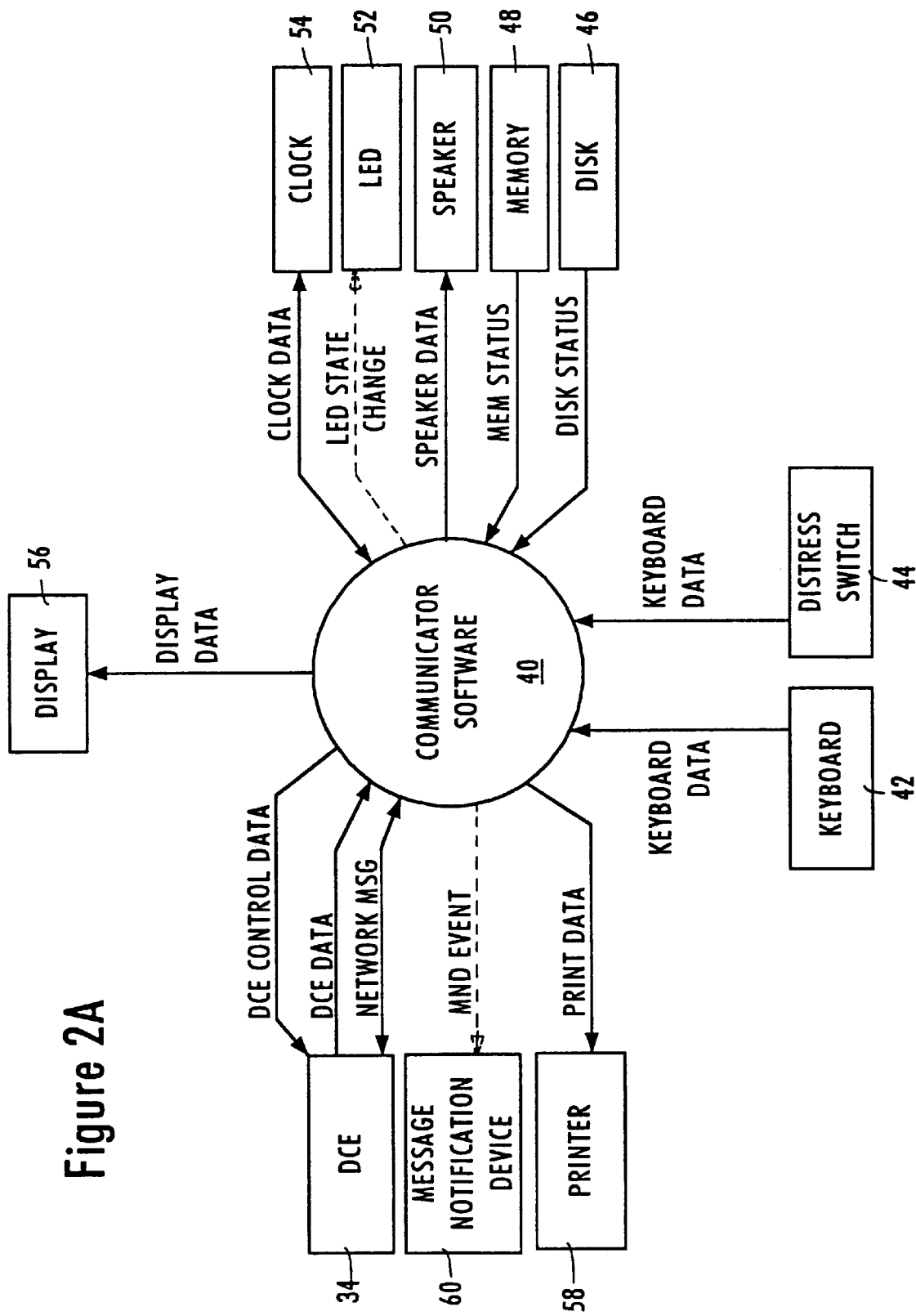
FIG. 2A is a block diagram illustrating the mobile communication system of the present invention.

FIG. 2A is a block diagram of the internal hardware and software structure of the AMC 18. The AMC 18 includes the communicator software 40 including the middleware software 36 and the application software 38. The DTE 32 includes hardware components interacting with the software 40, for example a keyboard 42 and a distress switch 44 on the keyboard and/or dashboard 42 that outputs an emergency message to the dispatcher 12 when depressed. The DTE 32 also includes a RAM Disk 46, for example an NVRAM, a read only memory (ROM) 48 storing the operating system, the software code, and selected configuration data. According to the preferred embodiment, the disk 46 has 2 Megabytes of random access memory that includes the standard 640 k/ 384 k used by the processor for the operating system, and the memory 48 includes one megabyte of protected NVRAM (flash) plurs 256 k for boot ROM. The DTE 32 also includes a piezo speaker 50, a message LED 52, a "READY" LED indicating the system is operational, and an internal clock 54. Display data is output to a display 56, described in detail below.

Additional peripheral devices may be connected to the DTE 32, including a printer 58 and a message notification device 60. The notification device 60 is preferably a localized RF paging device having a range of 100 meters for use when a driver is not within the vehicle. In such instances, the paging device 60 is activated when a satellite message having a predetermined priority level is received by the AMC 18.

Figure 2B:
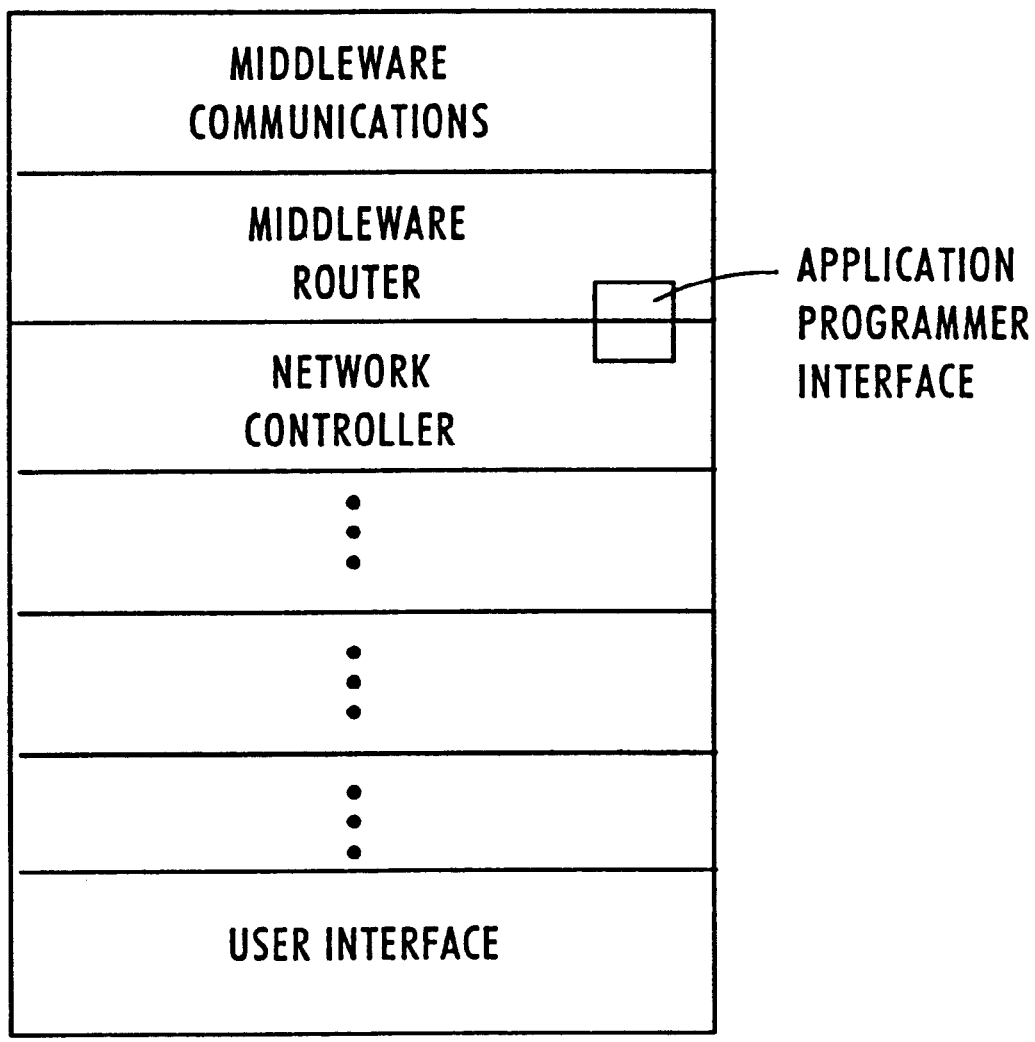
FIG. 2B is a diagram illustrating the layered structure of the software used by the mobile communication terminal of the present invention.

FIG. 2B is a diagram illustrating the layered structure of the software used by the mobile communication terminal of the present invention. In FIG. 2B, the mobile communications software features a layered software structure in accordance with the standards of the general ESO seven layer model. The layered structure permits individual layers to be easily replaced or modified. For example, by including a separate middleware communications layer, different low level communications code can be easily inserted or modified to support different radio transceivers. The middleware router layer supports different customer protocols or communications, and allows/facilitates the insertion or modification of same. The network controller layer allows or facilitates the insertion or modification of different network functionality. Finally, the user interface layer allows or facilitates the insertion or modification of new screen designs and/or information that is displayed to the user without requiring the recompilation of the software.

Figure 3:
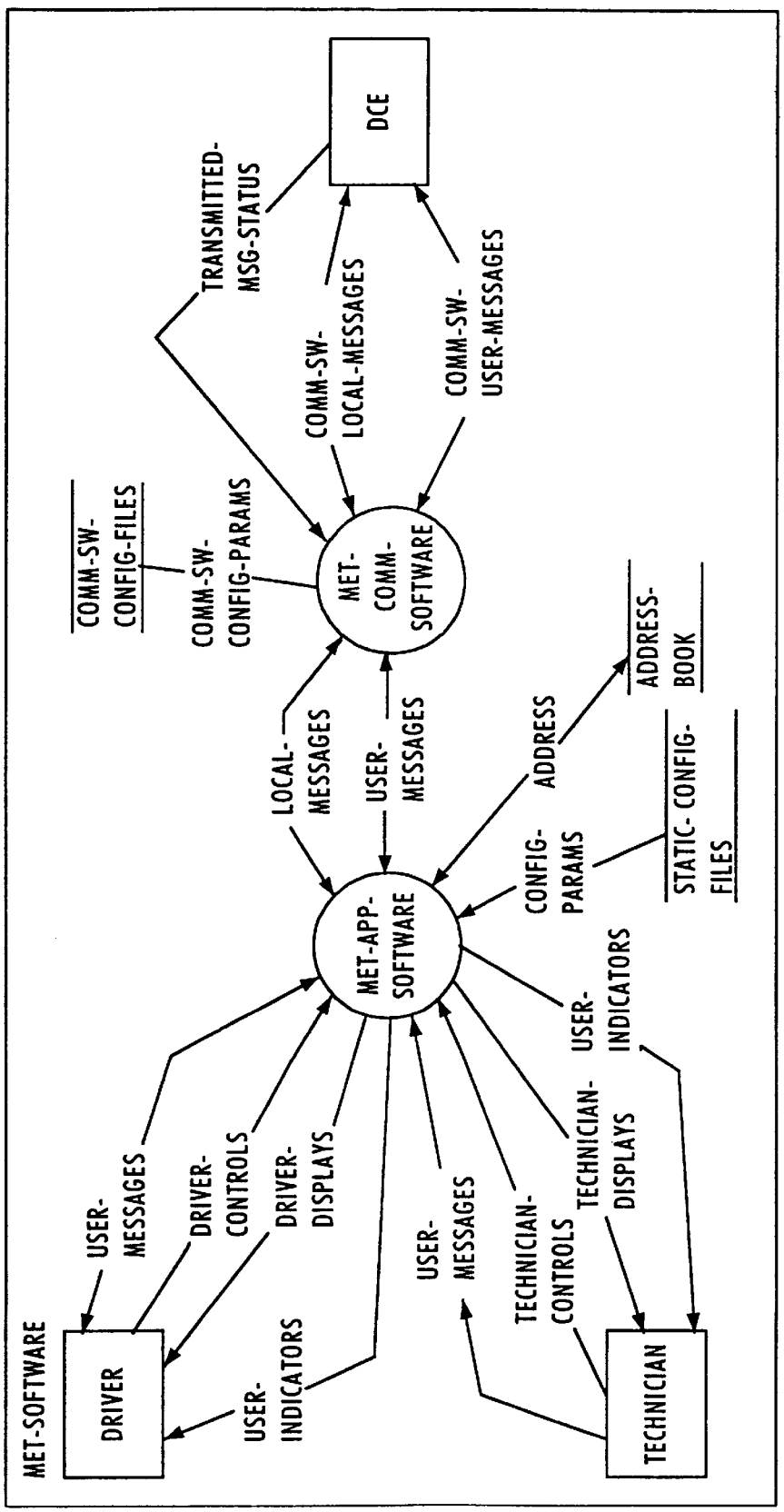
FIG. 3 shows the decomposition of the Mobile Earth Terminal into its application and communications software components.
Figure 4:
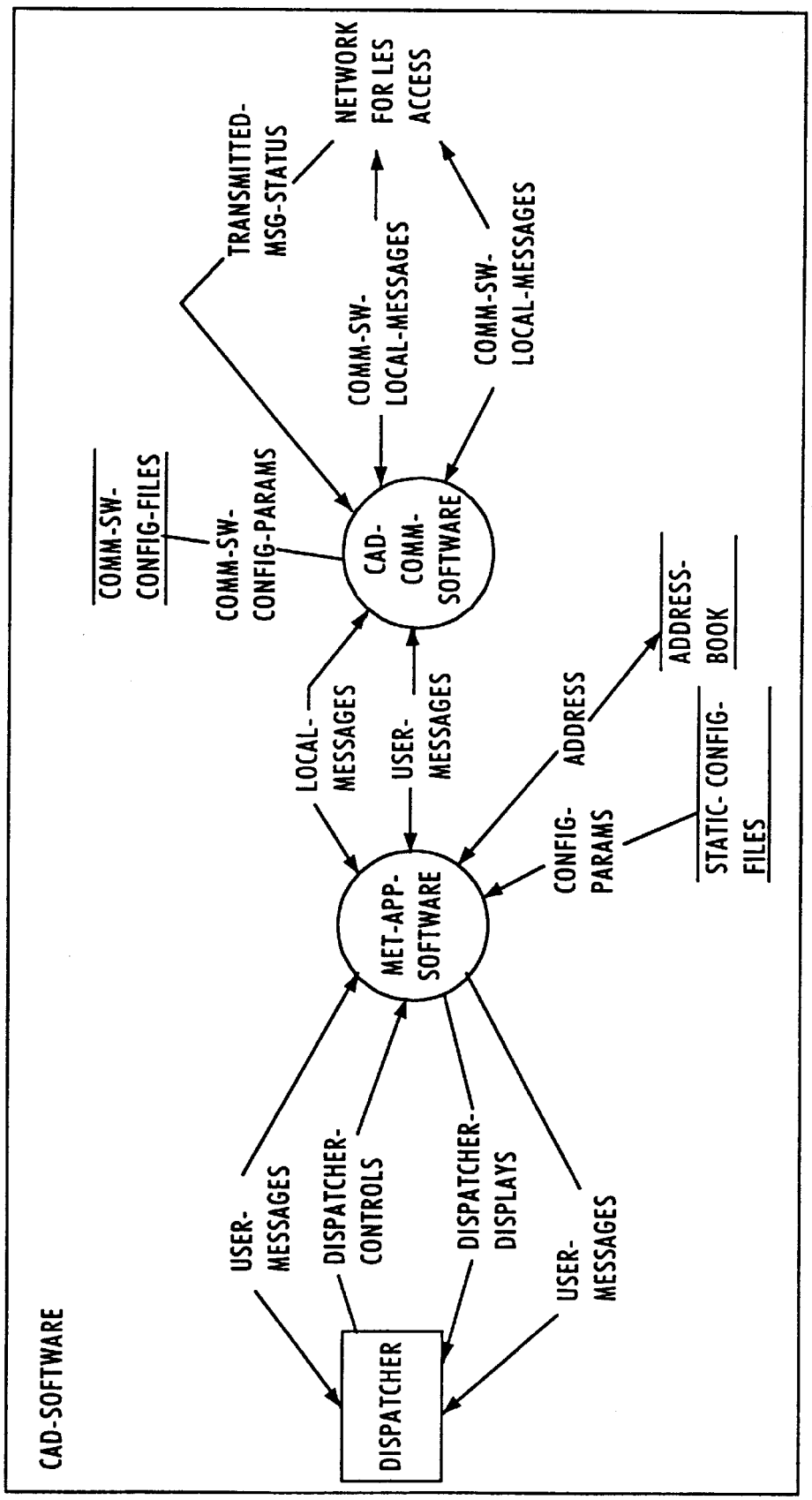
FIG. 4 shows the decomposition of the Customer Site systems into the application and communications software components.

FIG. 3 shows the decomposition of the Mobile Earth Terminal into its application and communications software components. The communications software integrates with the baselined application software. FIG. 4 shows the decomposition of the Customer Site systems into the application and communications software components. Various implementations of the customer site systems exist. The same version of communications software used to package data sent by mobiles must be used at the customer end to translate the packets, and vice versa. The communications software exists between the CAD applications and the network and does not require functional changes for different CAD implementations.

Figure 5:
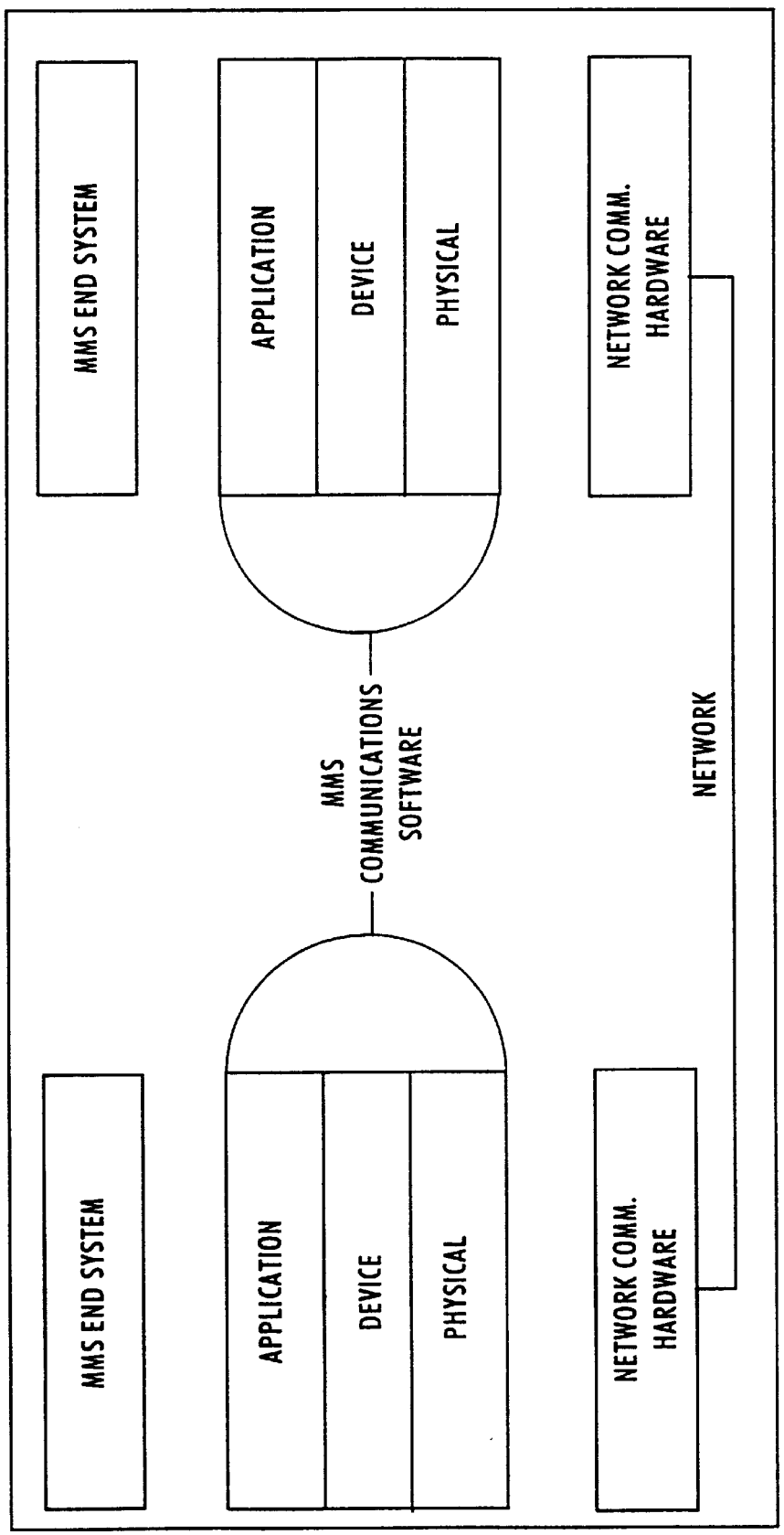
FIG. 5 is an illustration of the three specific layers of the Communications Software.

The three specific layers of the Communications Software include an applications layer, a device layer and a physical layer, illustrated in FIG. 5. The applications layer provides the services of the Communications Software that is standard across installations. These communications functions include: interfacing with the End System applications to send or receive MMS application messages, packaging/interpreting MCS packet header information used in transmitting the message over the network with the appropriate parameters, and maintaining the data structures used in providing those services (maintaining queues and timers, etc.).

The device layer provides the functions for controlling and configuring the physical devices used in attaching to the MMS network. This layer's services are tailored to the unique combination of installed devices. The applications layer provides data to and receive data from the 'Device' layer which utilizes device specific commands for sending/receiving data over the network.

The physical layer provides the services to the device layer to physically connect to the communications hardware. The design of the software makes use of this concept so that only the device and physical layers are different between installations, as well as the site specific configuration files. FIG. 5 illustrates this stack approach implemented for the MMS Communications Software. In those instances where the end systems' software components are being specifically discussed, they are referred to as "end systems."

Data Terminal MCS Processes/Functions Maintain Network Connections and Statuses

The communications software provides services to the application software in order for it to communicate user messages across the MMS network. The communications device used for network access is fully controlled and configured by the application software through the communications software. The mechanisms for controlling the communications device to send/receive messages and to configure its operational parameters vary between devices. The communications software supports exchanging these device specific data transactions through the Local Messages defined in Appendix A. In some instances, the communications software exchanges data with the device independent of any stimuli from the application software (e.g., for "polling" status information from the device). The commands and mechanisms used for all of the above functions are device specific and will vary between installations.

The communications software establishes connections with the network and maintains them to the extent required for the installation. On the data terminals, this involves communicating with the Data Communications Equipment (DCE) at initialization and informing it that the communications software is ready to send/receive data. The communications software does not need to actively maintain "sessions" or "circuits" since there is only one DCE servicing only one DTE (i.e., no resource sharing, one connection is established and remains active). Once the communications software has initialized, it communicates with the DCE and informs it that it is ready for communications. The communications software communicates with the DCE over the Comm Port.

The communications software monitors the health of the network and insulates the application from any adverse affects that may result from network degradation. The communications software polls the DCE to determine the health of the network. If the DCE responds with a system status message that indicates the network access is healthy, the communications software provides a Network Status Local Message to the AMC application indicating the network access status is "healthy". Otherwise, a "failed" network status is provided to the application in a Network Status Local Message. Since the status messages returned from the device may have other information that may be useful to the application, the communications software also provides a Comm Status Local Message to the application whenever a status message is received from the device with the binary representation of the string returned by the device.

The communications software monitors these incoming DCE system status messages for indications that the DCE is unable to communicate over the network. When the communications software receives user messages from the application for transmission and it has detected that the DCE is currently unable to transmit over the network, the communications software stores the messages and provides them to the DCE when the DCE indicates that it is once again ready for communications (via successful poll results).

When the communications software is terminated, it saves the current user message data structures and the assigned message ID information to the DTE's RAM Disk in a directory. When the communications software initializes, it reconstitutes its user message structures from any that exist in the directory on the DTE's RAM Disk. This allows asynchronous message services whereby messages that were sent by the communications software, but not fully confirmed and removed from processing, can be tracked and processing completed if the communications software re-initializes. Additionally, the communications software use the assigned message ID information retrieved from the directory at initialization to ensure that it does not reassign any recently used message IDs after a software restart.

Send End System Application Data Across Network

Figure 6:
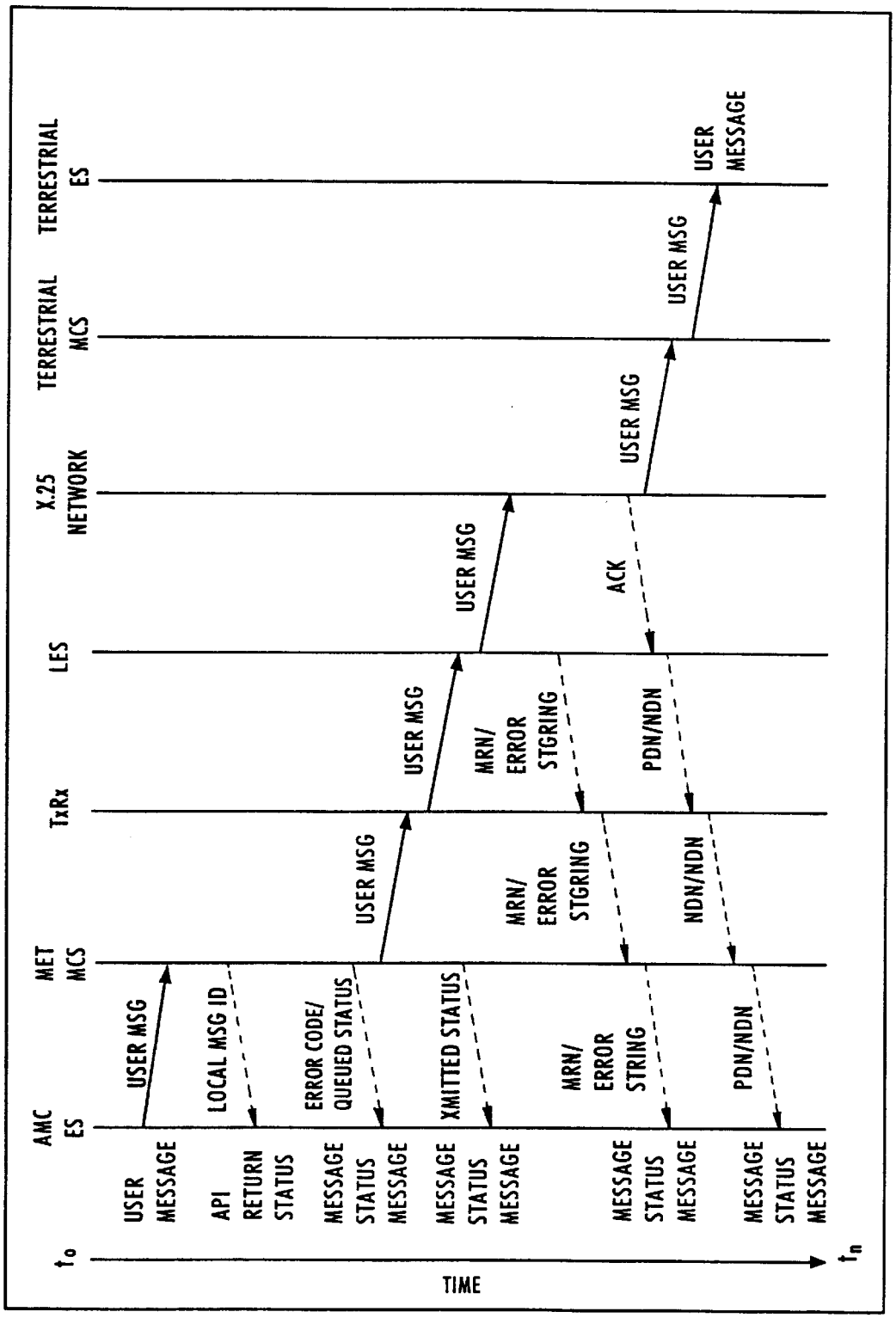
FIG. 6 illustrates the flows of User Messages and the message statuses through the MMS network.

The Mobile Communicator application software components require the MCS to accept their application messages and to ensure their appropriate transmission across the MMS network. The communications software accepts messages from the End System, configures the communications device with the appropriate parameters, and sends the data to the DCE for transmission. FIG. 6 illustrates the flows of User Messages and the message statuses through the MMS network.

Accept and Package End System Application Data

The application software constructs the application messages it needs to communicate and also controls the transmission parameters. Before providing data to the MCS to transmit, the application software assembles the user message buffer containing the contents of the application message as well as much of the MCS packet header. Those fields in the MCS packet header which are to be specified by the End System will have data defined for them when the packet arrives at the MCS. In addition to the message buffer with the MCS packet header, the application also supplies the destination address type and physical value.

The communications software uses the destination information supplied in these separate parameters for sending the message. When the MCS receives a packet for transmission across the network, it provides a local Message Reference ID to the application via the Application Programming Interface (API). The communications software then verifies the contents of the data from the application and add other header fields. The application message portion of the packet is not altered by the communications software.

The communications software places the binary representation of the string %+ in the Format Indicator MCS Packet Header field. This field is required to indicate to the receiving MCS that the incoming data stream is a valid MMS message.

The communications software verifies that the Message Type value inserted into the Message Type Packet Header field by the application software is the hexadecimal value 01. This value indicates the message is a user message. If no Message Type is indicated by the application or an invalid value is indicated, the communications software does not send the message over the network but, instead, provides a Message Status Local Message to the originating application with a status code indicating "Bad Message Type".

The communications software verifies that the Priority Level inserted into the Priority field by the application software is a valid numeric value between 0 and 9. If no Priority is indicated by the application or if the application indicated an invalid value, the communications software place a default value in the Priority field of the MCS packet header.

The communications software verifies that the Acknowledgment Level inserted into the Ack Level field by the application software is one of the following valid integer values: '0' (None) or '1' (Service). If no Acknowledgment Level is indicated by the application or an invalid value is indicated, the communications software places the default value in the Ack Level field of the MCS packet header.

The communications software verifies that the application software has provided a valid Destination Address Type and Destination Physical Value combination for the Destination Address Type and Destination Address Value parameters (not the packet header fields). If an invalid Type/Value combination has been provided the communications software does not send the message over the network but, instead, provides a Message Status Local Message to the application with a status code indicating Invalid Destination.

Data in the other packet header fields entered by the application software is not be altered by the communications software (i.e. the Source and Destination Alias, Address Type, and Address Value fields, and the Application Message Length field).

Appendix B indicates other fields included in the packet header to support enhanced features such as failed message retries, message acknowledgment, and message segmentation. These fields are used by the communications software to support reassembly and decoding of the packet by the receiving communications software.

Send Message Across Network

After the communications software has received a message from the application software for transmission and completed packaging it within a MCS packet with the appropriate header information, the communications software provides a Message Status Local Message to the application indicating a Message Queued status. In order to send the message across the network, the communications software sets the appropriate parameters in the data communications device and sends the packet to the device for transmission. Once a message has been handed off to the DCE for transmission, the communications software provides a Message Status Local Message to the application indicating a Message Transmitted status.

The software configures the message packet in little endian, reverse byte order before providing the binary data to the DCE for transmission across the network. The communications software provides the messages to the DCE in the appropriate order as specified by the message priority. Lower priority numbers indicate higher message importance and are provided to the DCE before messages with higher priority numbers. Messages with a priority level of 0 or 1 are provided to the DCE with a "Distress" indication. All other messages have a "Normal" indication.

To send a message, the communications software sends the appropriate standard message parameter commands to the DCE in order to set up the transmission according to the values in the Priority and Ack Level header fields, and the provided Destination Address Type and Physical Value parameters.

MMS customer uses of the system often impose widely varied responsibilities between installations. Many users may perform duties that require them to send messages much more often than other users. Meanwhile, some users may constantly receive messages and only need to send a message rarely. With this in mind. the a send/receive ratio parameter provides a way of customizing the performance of the communications software. The parameter is defined as "# send actions per # receive actions". The first part of the parameter indicates the number of times the communications software checks for and executes pending send message actions for every second parameter part number of receive message actions taken. The communications software uses this parameter to configure the frequency of send versus receive actions.

Monitor Sent Message Statuses

When the communications software sends a message over the network, the Land Earth Station (LES) returns a Message Reference Number (MRN) to the DCE when it successfully receives and accepts the message. The communications software receives this MRN information from the DCE for all transmitted messages. The format and syntax of the commands used to retrieve this information from the MET's DCE are device specific. Whenever the communications software receives an MRN for a message it previously sent to the network, it provide a Message Status Local Message with the MRN data to the application. Note that MRN information will generally be the only positive acknowledgment received when "None" level acknowledgment is requested for the message.

When the communications software sends a message over the network requesting "Service" level acknowledgment, the LES provides a Positive Delivery Notification (PDN) to the DCE when it successfully delivers the message to the destination communications device. Likewise, if the LES is unable to deliver the message, a Negative Delivery Notification (NDN) is provided to the DCE. The communications software receives this PDN/NDN information from the DCE for the transmitted messages. Whenever the communications software receives PDN/NDN status information for a message it previously sent to the network, it provides a Message Status Local Message with the PDN/NDN status indication to the application.

Whenever the communications software receives the required response for a transmitted message (i.e., an MRN for a message sent with "None" Acknowledgment level, or a PDN or NDN for a message sent with "Service" Acknowledgment level), the communications software marks that message as successfully transmitted and is no longer required to track that message. Messages that have been successfully transmitted do not need to be saved at communications software termination. Note that an NDN may be received for a message that fails but has been marked as successfull and deleted due to a received MRN ('None' was the Ack Level). The communications software still reports that NDN information to the end system in a Message Status Local Message including the MRN received with the NDN in the local message. Since the Local Message Reference ID may not be available, this Message Status Local Message might not contain data for that field.

Recieve Data From Network

The communications software interfaces with the DCE and accepts data streams received by the communications device. The communications software monitors the incoming data and if the message begins with a data sequence that matches the Format Indicator, the communications software identifies the incoming data stream as an MMS user message that it should receive. For each incoming user message, the communications software also receives an MRN for the message from the DCE. The communications software provides this MRN to the application with the user message. This MRN is included with the message sent to the application; it is not included in a separate Message Status Local Message as in the transmitted message case.

Process DCE Commands/Configurations

No matter what communications device is used, the application software constructs the DCE command, configuration, and query character strings defined for the device to send to the DCE. The MMS Communications Software receives these character strings in a Command Local Message from the Application Software. The communications software then sends the unchanged command/query string included in the message to the DCE. The DCE responds to these commands and queries with response strings. Whenever the communications software receives command or query responses from the DCE, it sends the binary representation of the string received to the Application Software in a Comm Status Local Message.

The communications software also receives DCE Event messages from the communications equipment and provides them to the application software in Comm Status Local Messages. Again, the communications software provides the binary representation of the string received from the DCE in the local message.

Terrestrial MCS Processes/Functions

The communications software defined herein provides communications services to a "terrestrial end-system". The terrestrial end-system includes a Computer Aided Dispatch (CAD) system which requires access to the MMS network in order to communicate with the customer's mobile units. A typical customer "terrestrial end-system" also includes a Customer Premises Gateway (CPG) to provide gateway services to the CAD system. On this gateway, there is communications software (AIA) which exchanges data with the CAD system and reformats/translates it into data for the communications software to exchange across the network.

Likewise, incoming messages and status information is given to the CPG application software where it is reformatted and translated into inputs to the CAD application. This setup isolates the CAD system from any changes due to the implementation of communications software changes. Instead, the CPG application software absorbs the changes. In customer systems where no CPG is used but, instead, the CAD application communicates with the communications software directly, any changes to communications software interface must be accommodated by chances to the CAD software. The functions/processes defined herein do not change depending on whether the communications software is interfacing to CPG software or directly to CAD software. From the communications software standpoint, it is interfacing with a generic "terrestrial end-system".

On the terrestrial side of the MMS system, the communications software is responsible for opening and maintaining connections with the LES and exchanging data via those connections. There are several methods of connecting to and communicating with the LES which the communications software will support. The communications software may provide communications services between the Customer Premises Gateway (CPG) and the LES via an X.25 link. In other customer installations, the CAD system will access the LES via a dialup connection to an X.25 PAD using a modem. The "device" and "physical" layers of the communications software provide the services to communicate with the LES using the required protocol and access method.

The following functions are performed by the communications software in general to exchange data between customer applications and the LES. Configuration parameters are used to set up the specifics required for the communications software to affectively utilize the lower-layer device dependent communications protocols.

Maintain Network Connections and Statuses

The communications software is responsible for establishing connections with the network and maintaining them. On the terrestrial end of the MMS system, the communications software establishes and manages connections to the LES. The communications software performs several transactions with the LES at the same time. To manage these potentially simultaneous transactions, the communications software maintains "virtual circuits" with the LES on which the transactions are performed. Whenever a transaction is needed, the communications software finds an available circuit or establishes a new one.

Since the LES times-out a connection after a period of inactivity or closes a connection after a certain number of transactions, the communications software maintains these circuits and monitors which ones are available. If the communications software needs to perform a transaction when no circuits are open and no more are allowed (due to a maximum number of open circuits constraint), the communications software holds the transaction until a circuit is available or one can be opened.

There are two customer message reception modes supported by the LES. If the customer is set up for "store and forward", the LES stores all incoming messages until the LES connects and forwards the data to the customer's X.121 address. The communications software supports this mode by listening for connection requests from the LES and performing the necessary handshaking required to establish the LES connection and to receive the data being forwarded. These LES initiated connections do not count in the number of virtual circuits being maintained as described above. In "DNID storage" mode, the LES stores incoming data in customer assigned Data Network Identifier (DNID) files. The communications software supports requesting and retrieving these DNID files.

In order to access the LES, the communications software first configures its communications over the host computer's communications port (the port used depends on the LES access method). The communications software configures the port's communications settings.

The communications software is also responsible for monitoring the health of the network and for insulating the terrestrial end systems from any adverse affects that may result from network degradation. The communications software checks the network's health at a predetermined interval. If the LES access method is "Dialup", these network health checks consists of checking the status of accessing the Comm port and the health of the modem. If the LES access method indicates "Direct", these network health checks involve ensuring that connections to the LES can actually be made (or that existing ones can be used). This second type of check is used because it gives more information without costing the customer any additional "connection" charges.

The communications software sends the results of these network health checks to the terrestrial end-systems software in a Network Status Local Message as defined in Appendix A. If the check indicates that the connection is healthy, the Network Status message indicates "Healthy"; otherwise, the status provided in the local message indicates "Failed".

The communications software monitors these network health check results for indications that the communications with the LES are down. When the communications software receives "user" messages from the end-system application for transmission and it has detected that the access to the LES is down, the communications software stores the messages and provides them to the LES when a health check indicates that the network is once again ready for communications.

When the communications software is terminated, it saves the current "user" message data structures and assigned Message ID information to the disk in a predetermined directory. When the communications software initializes, it reconstitutes its "user" message structures from any that exist in the directory on the disk. This allows asynchronous message services whereby messages that were sent by the communications software, but not fully confirmed and removed from processing, are tracked and processing completed on if the communications software re-initializes. Additionally, the communications software uses the assigned message ID information retrieved from the directory at initialization to ensure that is does not reassign any recently assigned message IDs after a software restart.

Send End System Application Data Across Network

The customer's Computer Aided Dispatch application software components requires the MCS to accept their application messages and to ensure their appropriate transmission across the network. In customer configurations that utilize a CPG for network gateway services, application software running on the CPG (the AIA software) is responsible for using the communications software for exchanging CAD application messages.

The communications software provides message services to a "terrestrial end-system." The terrestrial end system may be merely a CAD application or both a CAD application and the CPG application software used for gateway services. The communications software accepts messages from the terrestrial end system, constructs the appropriate LES command string, and sends the data to the LES for transmission.

Figure 7:
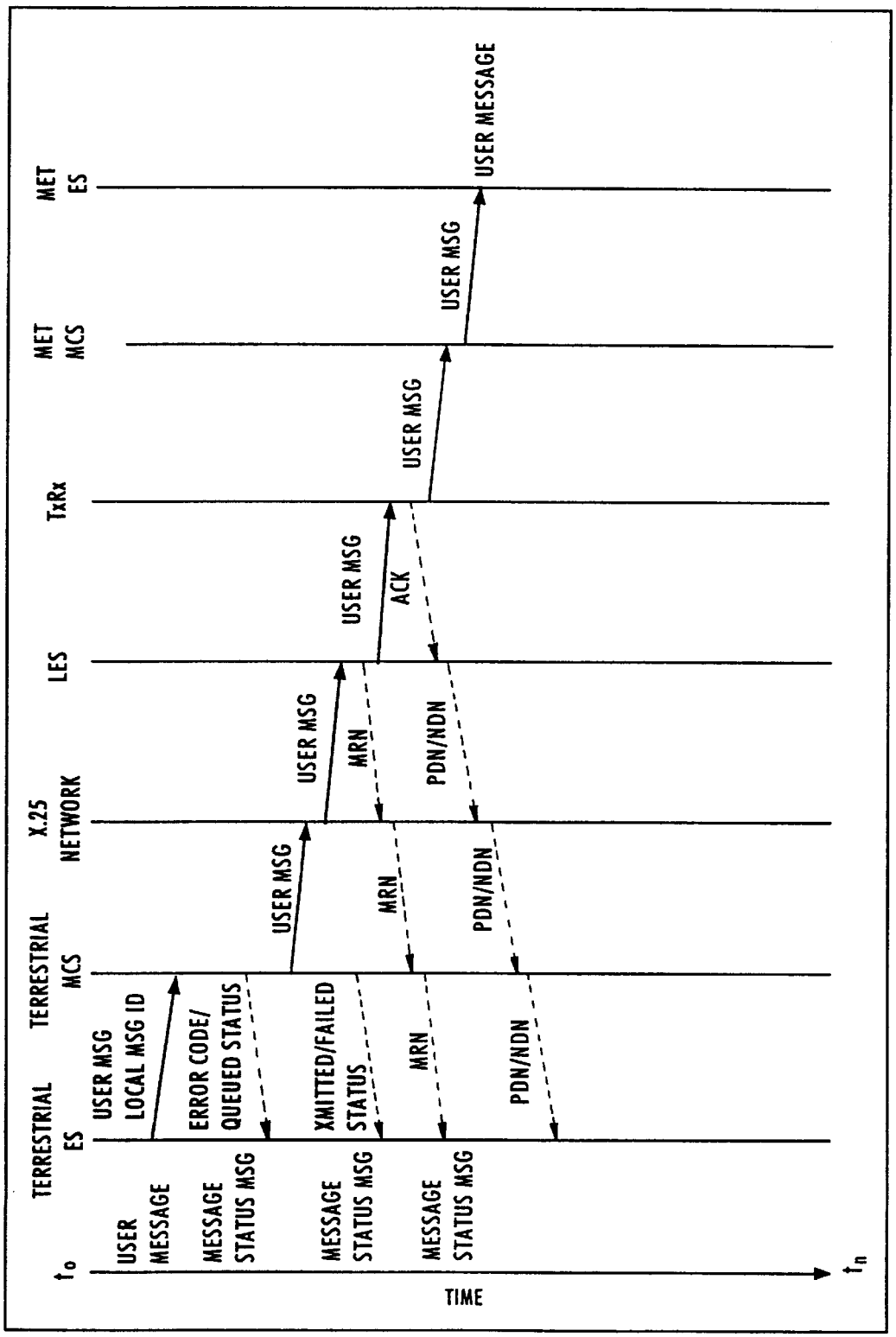
FIG. 7 illustrates the flow of user messages and the message statuses through the MMS network.

FIG. 7 illustrates the flow of user messages and the message statuses through the MMS network.

Accept and Package End System Application Data

The terrestrial end-system constructs the application messages it needs to communicate and also has control over many of the transmission parameters. Before providing data to the MCS to transmit, the terrestrial end-system assembles the message buffer containing the contents of the application message as well as much of the MCS packet header as defined in Appendix B. Those fields in the MCS packet header which are to be specified by the end system will have data defined for them when the packet arrives at the MCS. (Note, some fields are optional and are only used by the MMS end-systems. The presence of data for those fields is indicated by the flags set in the Flags header field.)

In addition to the message buffer with the MCS packet header, the end-system applications also supplies the destination address type and physical value. There are fields defined in the MCS packet header for this information. The communications software uses the destination information for sending the message, not the values indicated in the optional packet header destination address fields.

Many CAD applications generate a Local Message ID when a message is created and supply this with the message to the communications software. If the communications software receives a message packet for transmission across the network and it is accompanied by a CAD application generated message ID, the communications software uses that message ID as a common message reference between the two software systems.

The communications software does not generally include any local message ID in the packet sent to the LES for transmission. Otherwise, when the MCS receives a packet for transmission across the network without a CAD generated message ID, it provides a Local Message ID to the end-system. The communications software verifies the contents of the data from the end-system and adds other header fields as defined in Appendix B. The application message portion of the packet is not generally altered by the communications software.

The communications software places the binary representation of the string %+ in the Format Indicator MCS Packet Header field defined in Appendix B. This field is required to indicate to the receiving MCS that the incoming data stream is a valid MMS message.

The communications software verifies that the Message Type value inserted into the Message Type Packet Header field by the terrestrial end-system is the hexadecimal value 01. This value indicates the message is a "user" message. If no Message Type is indicated by the end system or an invalid value is indicated, the communications software does not send the message over the network but, instead, provides a Message Status Local Message to the originating end system with a status code indicating "Bad Message Type".

The communications software verifies that the Priority Level inserted into the Priority field by the terrestrial end-system application software is a valid numeric value between 0 and 9. If no Priority is indicated by the end system or if the end system indicated an invalid value, the communications software places the value in the Priority field of the MCS packet header.

The communications software verifies that the Acknowledgment Level inserted into the Ack Level field by the terrestrial end-system is one of the following valid integer values: 0 (None) or 1 (Service). If no Acknowledgment Level is indicated by the end system or an invalid value is indicated, the communications software places the value in the Ack Level field of the MCS packet header.

The communications software verifies that the terrestrial end-system has provided valid 9 digit Mobile ID as the Destination Address Value parameter (not the packet header field). If an invalid destination address has been provided by the end system, the communications software does not send the message over the network but, instead, provides a Message Status Local Message to the originating end system with a status code indicating "Invalid Destination".

Data in the other packet header fields entered by the end-system is not altered by the communications software (i.e., the Source and Destination Address Alias, Address Type and Address Value fields; and the Application Message Length fields, and the like).

The communications software supports enhanced features such as failed message retries, user message acknowledgement, and message segmentation. These fields are used by the communications software to support reassembly and decoding of the packet by the receiving communications software. Space is also provided in the Flags field for the communications software to use in indicating these parameters are present in the packet header.

Send Message Across Network

After the communications software has received a message from the terrestrial end-system software for transmission and has completed packaging it within a MCS packet with the appropriate header information, the communications software provides a Message Status Local Message to the end-system indicating a "Message Queued" status. In order to send the message packet, the communications software constructs and issues the appropriate LES commands, the provided Destination Address information, and the parameters in the packet header.

If an error occurs in building the MCS packet for the message or in building and issuing the required LES command, the communications software provides a Message Status Local Message to the end-system indicating a "Message Failed" status. Otherwise, once the message has been sent to the LES, the communications software provides a Message Status Local Message to the end-system application indicating a "Message Transmitted" status.

The communications software configures the message packet in little endian. reverse byte order before providing the binary data to the LES for transmission across the network. The communications software provides the messages to the network in the appropriate order as specified by the message priority. Lower priority numbers indicate higher message importance and are provided to the DCE before messages with higher priority numbers.

Different MMS customers send and receive messages with differing frequencies. Some terrestrial systems constantly send messages to their mobiles while others mainly receive and monitor reports from their mobiles. With this in mind, the communications software provides a way of customizing its performance. The parameter is defined as "# send actions per (:) # receive actions". The first part of the parameter indicates the number of times the software checks for and executes pending send message actions for every second parameter part number of receive message actions taken. The communications software uses this parameter to configure the frequency of send versus receive actions.

Monitor Sent Message Statuses

When the communications software sends a message over the network to the LES, the LES returns a Message Reference Number (MRN) to the communications software when it successfully receives the message. The communications software receives this MRN information and it provides a Message Status Local Message with the MRN data to the terrestrial end-system. If the communications software receives an error code as the response to the send message to LES function, the communications software provides a Message Status Local Message to the end system indicating a "Message Failed" status code.

Additionally, the LES provides a Positive Delivery Notification (PDN) to the communications software if it has successfully delivered a message to the destination communications device. Likewise, if the LES is unable to deliver a message, a Negative Delivery Notification (NDN) is provided to the communications software. The communications software receives this PDN/NDN information and provides it to the terrestrial end-system via a Message Status Local Message with the appropriate PDN/NDN status indication.

Whenever the software receives the required response for a transmitted message (i.e. an MRN for a message sent with "None" Acknowledgment level, or a PDN/NDN for a message sent with "Service" Acknowledgment level), the communications software marks that message as successfully transmitted and is no longer required to track that message. Messages that have been successfully transmitted do not need to be saved at software termination.

Receive Data From Network

The communications software interfaces with the LES and receives messages addressed to the customer's account via LES commands. For customer's set up in "store and forward" mode, the communications software listens for and accepts LES initiated connections to receive messages addressed to the customer's X.121 address. Additionally, the communications software queries the LES at the rate indicated by a predetermined interval, and downloads all DNID files currently stored in the customer's account. The communications software forwards all incoming user message packets as received to the terrestrial end system application.

The communications software meets the following system load requirements provided that the communications software is hosted on a machine with sufficient processing power for its operations and the network provides sufficient bandwidth for all of the required data transactions. The communications software specified in this document provides services for a system load of 1 message per hour in each direction and 1 data report per hour for each of 3,000 mobile units. Under these conditions, the average queue sizes maintained by the communications software remain stable (i.e., they will not grow such that they require an ever-increasing amount of system resources).

Interface Between CAD and CPG Applications

The following specifies the interface between the customer premises gateway (CPG) and the host platform running the computer aided dispatch (CAD) application. The application interface deals with sending and receiving messages and ensures that the satellite services are available to the CAD application. In addition, the communication interface between the CPG and the host platform is also described.

Message Flows

Figure 8:
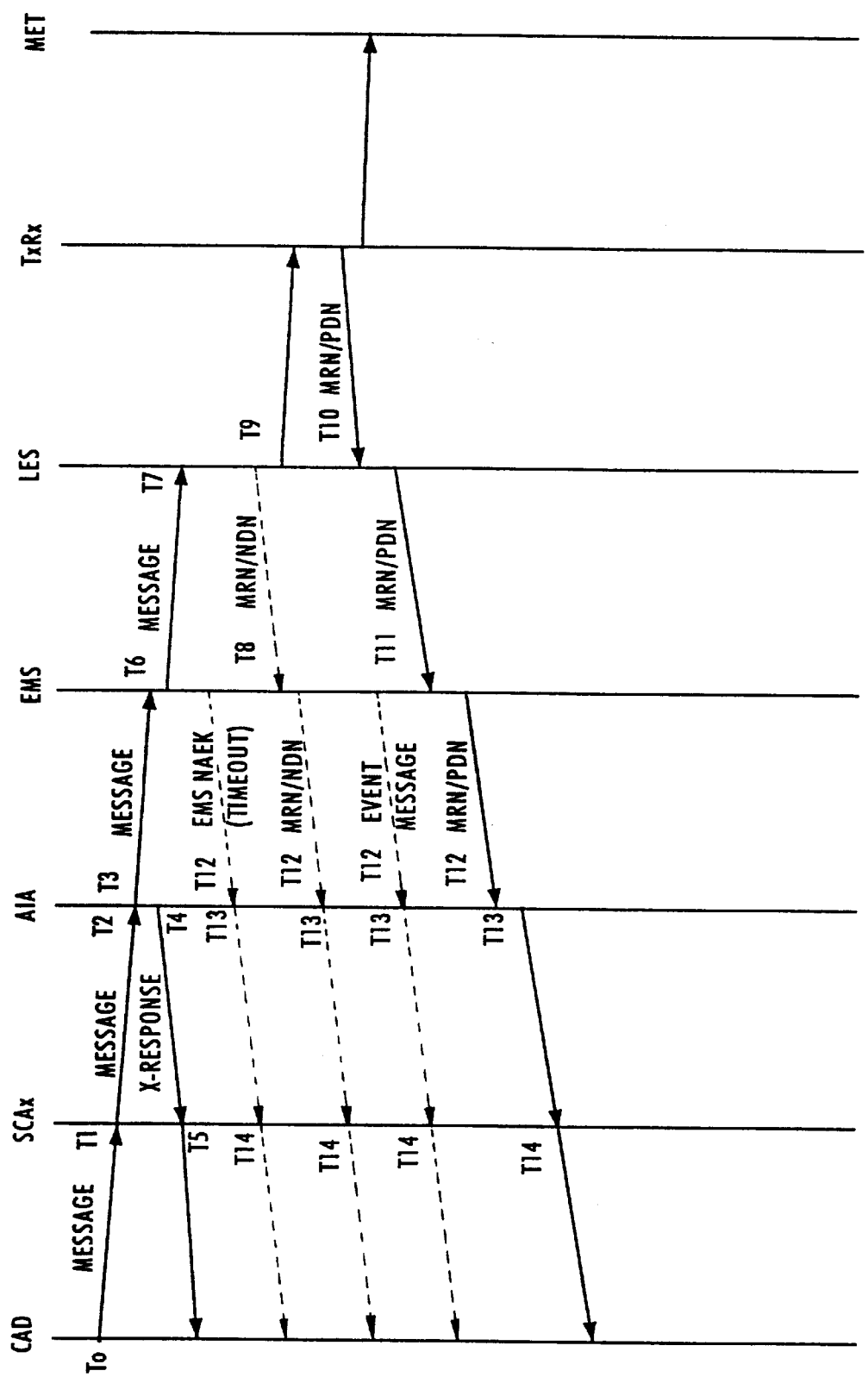
FIG. 8 illustrates the message flow timing diagram for outbound messages from the CAD application.

FIG. 8 illustrates the message flow timing diagram for outbound messages from the CAD application. The CAD application sends a message to the CPG. The CPG then sends the message outbound to a Mobile Earth Station. The Outbound Message may contain a fixed format message or a proforma.

The CAD application issues a status request. A status request is a request that tells the CPG to check the status of a previous Outbound Message. This message does not produce any satellite traffic. The CAD application issues a purge command. The purge command is a command that tells the CPG to purge all pending messages outbound or inbound regardless of their state. This command is destructive and should be used very sparingly. This message does not produce any satellite traffic.

The CAD application also issues a delete command. A delete command is a command that tells the CPG to delete pending Outbound Messages by message ID or by physical destination. This message does not produce any satellite traffic.

Figure 9:
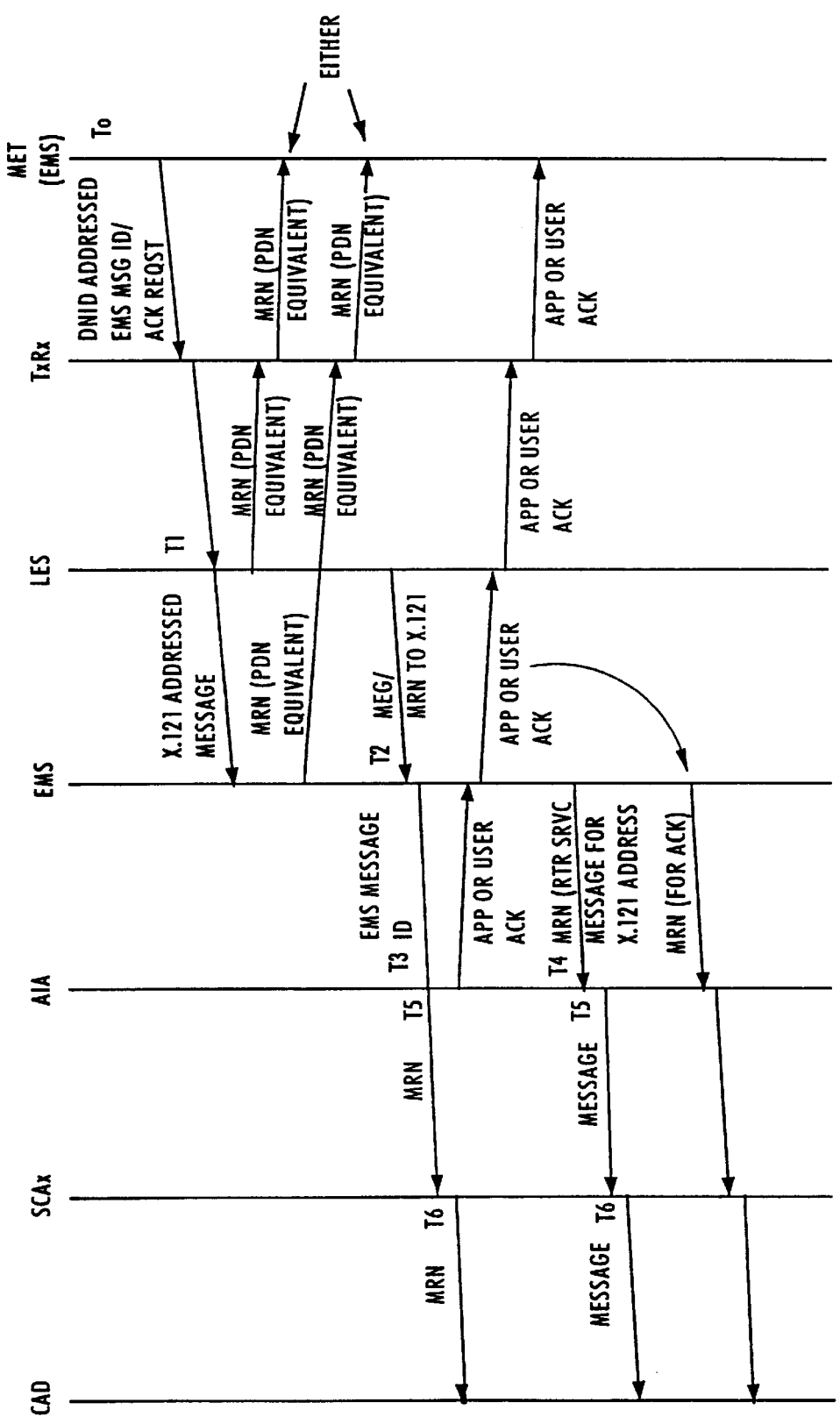
FIG. 9 is an illustration of the inbound timing diagram of messages for the CAD.

The CAD application receives inbound messages as well. FIG. 9 is an illustration of the inbound timing diagram of messages for the CAD. The Mobile Earth Station sends a message inbound to the CPG. An inbound message contains either a fixed format message or a proforma. Another inbound message is the Global Position (GPS) Message. The transceiver of the Mobile Earth Station sends a GPS report to the CPG indicating, for example, the position of a truck or a sea vessel. The CPG formats this report and sends it to the CAD. This type of message contains the longitudinal and latitudinal coordinates of the vessel on which the MES resides. The message may also contain the speed and course of maritime vessels.

The CAD application also receives the inbound Satellite Long-On/Log-Off Message. The transceiver of the Mobile Earth Station sends Satellite Long-On/Log-Off Data Reports to the CPG indicating that the MES is turned on (Log-On) or turned off (Log-Off). If the MES is turned on, the Log-On Message contains the spot beam on which the MES is communicating.

The CAD application also receives the inbound Logical Log-On Message. The Mobile Earth Station sends a Log-On Message inbound to the CPG. The Log-On Message contains a logical name, application name, and physical address. The CPG then associates the logical name and application name to the physical address. Another inbound message is the Logical Log-Off Message. The Mobile Earth Station sends a Log-Off Message inbound to the CPG. The Log-Off Message contains a logical name, application name, and physical address. The CPG then disassociates the logical name and application name with the physical address.

Another inbound message is the Activation Log-On Message. The Mobile Earth Station sends an Activation Log-On Message to the CPG indicating that the MES software installation is complete. This type of message contains the LES ID, the DID and Member Number combinations, the alias (logical name), and the Mobile-ID. The CPG uses this information to update or add to the directory services table and generates a response indicating the success or failure of the Activation Log-On Message. The CAD can specify whether or not they prefer to receive this type of message.

Another inbound message that the CAD receives is the Event Message. The CPG receives events that the LES generates. The Event Message contains an event number corresponding to the state of the LES. The CPG send this Event Message to the CAD Application.

In addition to inbound messages, the CAD also received acknowledgements. For example, the CAD receives the MRN Message. The CPG creates an MRN Message for every outbound message originating at the CAD application. This message contains information that cross references an identification number with the success or failure of each message. The CPG receives this message from the LES and forwards it to the CAD Application.

The CAD also receives the Transmit Response. A Transmit Response message is a message that the CPG creates after it successfully queues an Outbound Message or executes a command or request. The CPG generates a message containing a field to indicate the type of message, command, or request to which the response corresponds. The message also contains the message id, status code, and reason code associated with the original message, command or request.

The CAD also receives a Neg-Acknowledgment. A Neg-Acknowledgment is a non-delivery notification that the CPG generates when a message either fails to be queued at the CPG or fails anywhere between the CPG and the destination application. The CAD also receives an Application Acknowledgment. The remote EMS application generates an Application Acknowledgment upon receiving a message requiring an application confirmation. Further, the CAD receives a User Acknowledgment. The remote EMS application generates a User Acknowledgment when the user receives a message requiring user confirmation.

Message Format-Transmitting To/Receiving From CAD Application

Table 1 illustrates the CAD header. The CAD header and Message Detail have the following format:

Flag Section(F):

This section specifies the type of information that is contained in the header and message detail. The two fields in this section are Type and Sub Type. The Type field indicates the category to which the inbound or outbound message corresponds. The Sub Type field indicates a more specific category of the Type field. This field is not mandatory.

Control Section (C):

This section specifies the type of message service and level of control needed to deliver the message. The CAD ID is a message identification number that provides a method to track a message to and from the CPG. The Status Code is a field that indicates the status of a corresponding message. The Reason Code field is a field that corresponds to the Status Code. The Priority field indicates the urgency of the corresponding message. The Confirmation Mode field indicates the level of acknowledgment that the corresponding message will convey to the destination application. The Time Stamp field indicates the time that the CPG receives inbound messages. The CAD application supplies the time for this field for outbound messages. The Message Size field indicates the length, in bytes, of the corresponding message.

Address Section (A):

This section specifies the source and destination addresses for the message.

Data Section (D):

This section contains binary or text data.

Table 2 illustrates the CAD Outbound Message header, and Table 3 illustrates the outbound message detail. The CAD application sends a message header and a message with the confirmation mode field set to "none", "application", or "user" and a CAD Identification Number.

The CPG receives this message, restructures it, and attempts to queue the message. If the queuing is successful, then the CPG generates a Transmit Response message. If the CPG fails to queue a message, then the CPG generates a Neg-Acknowledgment instead of a Transmit Response.

Regardless of the confirmation mode, the CPG generates an MRN message containing positive or negative delivery information. If the MRN Message contains positive delivery information and the confirmation mode of the original message is "application", the application residing at the destination generates an Application Acknowledgment. If the MRN Message contains positive delivery information and the confirmation mode of the original message is "user", a User Acknowledgment is sent back after the user sees the message. If the message fails anywhere between the CPG and the AMC application, or user application, the CPG generates a Neg-Acknowledgment.

Table 4 illustrates the Status Request message. The CAD application sends a Status Request containing the CAD ID and the CAD ID to which the request refers. The CPG performs the function and returns the Status Response.

Table 5 illustrates the CAD Inbound Message header, and Table 6 illustrates the inbound message detail. The Mobile Earth Station generates an inbound message. The CPG receives the Inbound Message, reformats it, and delivers it to the CAD application. For inbound messages that the CPG receives through an X.121 address, the CPG generates an MRN Message. DID addressed messages do not contain an MANS. Therefore, for these messages, the CPG generates an MRN Message that contains empty MRN fields.

Table 7 illustrates the service message header for an event message. Event messages are nonsolicited messages generated by the AIA, EMS or LES interfaces that do not refer to a particular message. Instead, these messages reflect the state of the satellite system.

Table 8 illustrates a Satellite Log-On-Off Message header, and Table 9 illustrates a Satellite Log-On-Off Message detail. The transceiver on the Mobile Earth Station sends Satellite Log-On Messages when the power is first turned on and as the MES traverses through different spot beams to signal that the MES is available. The transceiver sends a Satellite Log-Off message as a part of a power down sequence to indicate that the MES is unavailable. The CPG receives the Log-On-Off messages, reformats them, and delivers them to the CAD application. Both Log-On and Log-Off messages contain the name of the spot beam in which the MES exists during the time of transmission and the time stamp indicating the time the LES receives the message. The spot beam field for Log-Off messages is 'UNK ' (Unknown).

Table 10 illustrates a Global Position report header, and Table 11 illustrates a Global Position report detail. The transceiver on the Mobile Earth Station sends Global Position Messages as the MES traverses through a region. The CPG receives the Global Position messages, reformats them, and delivers them to the CAD application. The GPS Message contains a field, Sub Type, to indicate whether the MES is reporting a land (L) or a maritime (M) position. These messages also contain the latitudinal and longitudinal positions of the vessel. Depending on the configuration of the MES, maritime GPS messages may also contain the speed and the course of the vessel.

Table 12 illustrates a CAD transmit response header. The CPG generates a Transmit Response after successfully queuing an outbound message or executing a command or request that the CAD application sends to the CPG. The Type field indicates the type of message to which Transmit Response corresponds. If the Transmit Response corresponds to an outbound message, the type field will be set to 'X'. If the Transmit Response corresponds to a Purge Command, the type field will be set to 'P'. If the Transmit Response corresponds to a Delete Command, the type field will be set to 'D'. If the Transmit Response corresponds to a Status Request, the type field will be set to 'S'. The Transmit Response contains the CAD ID, Status Code, and Reason Code associated with the original message, command, or request.

Table 13 illustrates a CAD negative acknowledgement header. The CPG generates a Neg-Acknowledgment if the following conditions are met:

The LES rejects a message.

The AIA is unable to deliver the message to the EMS Queue.

Table 14 illustrates a CAD application or user acknowledgement header. The remote standard middleware application generates an Application Acknowledgment upon receipt of a message requiring an application confirmation. The middleware application generates a User Acknowledgment when the user receives a message requiring a user confirmation. The CPG receives these messages, reformats them, and sends them to the CAD application.

Table 15 illustrates a CAD MRN message header, and Table 16 illustrates a CAD MRN message detail. Outbound messages originating at the CAD application generate a corresponding MRN Message. The MRN Message contains Message Reference Number(s) (MRN(s)) that is used as a method to track a message through the satellite network. For every MRN, the MRN Message also contains a corresponding PDN (Positive Delivery Notification) or NDN (Negative Delivery Notification). The LES generates a PDN for every message that the transceiver successfully receives. The LES generates a NDN for every messages that the transceiver does not respond successfully. MRN messages may also occur when the AIA receives an inbound message through the X.121 address.

Processes Implemented by CPG Application

The CPG is one of the components of the overall MMS architecture. The other components are:

the Customer Host, which runs the customers Computer Aided Dispatch (CAD) software the public X.25 network the Land Earth Station (LES) which provides reliable store and forward Messaging service and proven interface the MSAT satellite network the mobile earth station EMS or other standard middleware on the CPG and the Mobile Earth Station provides communications integrity, standardized interfaces, and clear demarcation of responsibility at the customer premise.

Figure 10:
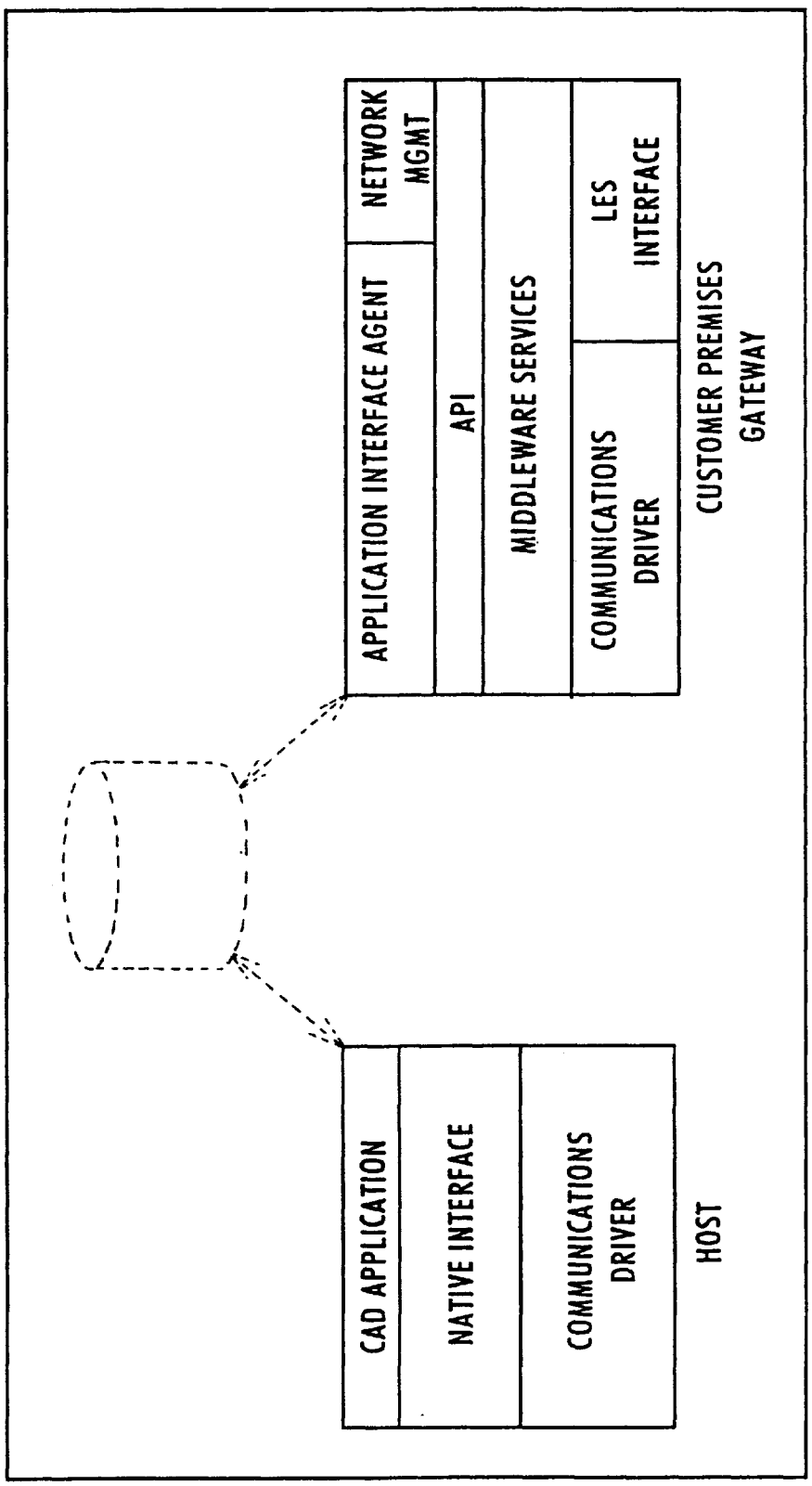
FIG. 10 illustrates the Customer Premise Gateway and host architectures for interfacing with the satellite network.

FIG. 10 illustrates the Customer Premise Gateway and host architectures for interfacing with the satellite network. By using a CPG, the communications software resides independently from the Customer's host. This provides a demarcation between the communications software responsibility for message delivery and a customer's application that uses the message.

The CAD application resides on the customer host and relies upon the CPG to deliver messages. Message exchange is based on a standard message format. The Customer Premises Gateway manages the interface between the CAD software and the Land Earth Station. The Application Interface Agent gets outbound messages from the CAD Application, and formats the messages as API calls to the middleware services. For inbound messages, the Application Interface Agent retrieves them from middleware, interprets them, and delivers them to the CAD Application.

The Network Management component consists of message logging functionality provided by the middleware services. The control information for every message handled by middleware is logged in a file. Personnel are capable of retrieving this file from the CPG. The API is the library of middleware functions which are called by applications to invoke Middleware Services which include LES Service. Standard Middleware Services are provided by CAI. They may consist of LES Services, Standard-C services, network management, compression, security, and context sensitive routing. Once these services are configured, they need only be called by applications using the API.

The Communications Driver is the communication protocol, and the hardware which interfaces with the physical transport medium. LES Interface is the interface to specific satellite services. The middleware provides the ability to send and receive messages, and to receive Data Reports. The LES is a component of the Mobile Messaging Service that serves as an interface between the CPG and the Mobile Earth Stations. The CPG and the LES communicate via the X.25 Network. The LES and the Mobile Earth Stations communicate via the satellite network. The X.25 network connects to the Land Earth Station for access to satellite services.

LES (not shown) is a store-and-forward Messaging node responsible for translation of outbound terrestrial service requests to satellite services. It also takes inbound messages and forwards them to the appropriate terrestrial location. The NOC Network Management Server (not shown) is responsible for collecting network management information such as that provided by middleware at the CPGs.

Figure 11:
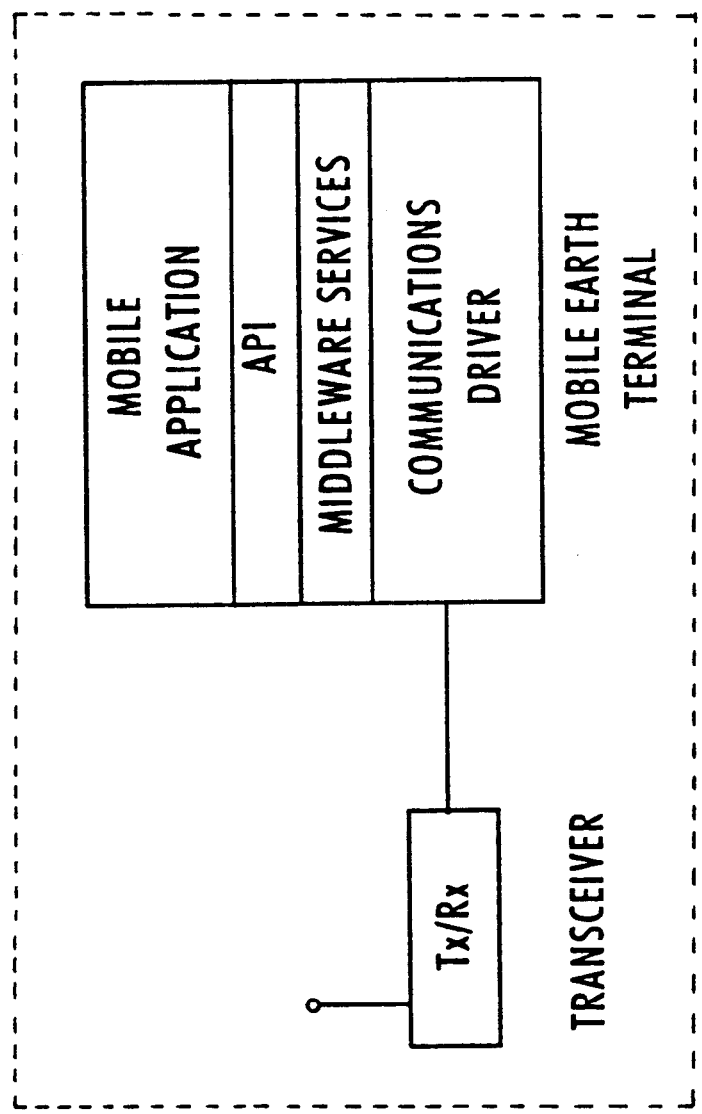
FIG. 11 is an illustration of the mobile earth station.

FIG. 11 is an illustration of the mobile earth station. The mobile earth station (MES) or data terminal is a component of the Mobile Messaging Service that serves as the end-user interface. The application residing on the MES consists of a mobile application that is built to allow customers to communicate with CAD applications over the satellite network.

The transceiver sends and receives messages over the satellite network. Messages received by the Transceiver from the satellite network are stored in a queue until retrieved by the Mobile Earth Terminal. In addition, other information, such as global position and signal strength, can be requested from the Transceiver. The Mobile Earth Terminal is the computer, or DTE in the vehicle. The Mobile Application is end-user interface and business functionality which resides on the Mobile Earth Terminal. The Mobile application utilizes services provided by the underlying middleware to allow customers to communicate with CAD applications over the satellite network.

The API is the library of middleware functions which are called by applications to invoke Middleware Services. Standard Middleware Services are provided by the selected middleware vendor, Complex Architectures, Inc. (CAI). Middleware services consist of message queuing, tracking message status, variable levels of message priority, variable levels of message acknowledgment, and data compression. The Communications Driver is the hardware and software which allows middleware to interface with the Transceiver.

LES Processes and Functionality

In order to send a message or messages from the CPG, a session with the LES is established over the X.25 network. The session can be either interactive or non-interactive. Interactive mode is designed for use by a user keying information in from a dumb terminal. Non-interactive mode is designed for computer driven message submission, and is the access method referred to herein. For message submission in non-interactive mode, the CPG follows the correct sequence of inputs and acknowledgments as defined by the standard X.25 Interface.

After a message has been accepted by the LES, a Message Reference Number (MRN) is returned by the LES which can later be used to identify the message. After all messages have been accepted by the LES the session is cleared. When the message is delivered to the mobile transceiver by the LES, a Positive Delivery Notification (PDN) is sent by the LES over the X.25 network to the CPG. If for any reason the message is not delivered to the mobile transceiver, a Non-delivery Notification (NDN) will be sent by the LES to the CPG.

Messages are sent from a mobile via the satellite using the standard message protocol. The mobile must specify the destination address (which can be a DNID file at the LES, the X.121 address of the CPG, or the SAC address of the CPG) and whether it wants a PDN or NDN for the message. When the message is delivered to the destination, a PDN is sent by the LES to the mobile if it was requested. If for some reason the message is not delivered, and PDN or NDN was requested, an NDN will be sent by the LES to the mobile.

Data Reports are short messages of up to 44 characters or bytes, which are sent from mobile without the normal Call Setup/Call Clearing procedure required for messages from a mobile. Data Reports are addressed to a DNID file at the LES. They are later retrieved by the CPG, or forwarded immediately by the LES to the X.121 address of the CPG. DNIDs for a given customer are centrally administered. An example where Data Reports are typically used to relay data is GPS, which provides means for determining the location of a mobile terminal using an onboard navigational system.

CPG Processes and Functionality

Functionality at the CPG can be divided into three levels: Application Interface Agent, Middleware, and Communications Agent. The Application Interface Agent performs the following functions:

Interfaces with the CAD Application

Receives outbound message requests from CAD Application and translates them into API calls Retrieves inbound messages and passes them to the CAD application Interprets non-messages (Data Reports)

Enables the CAD Application to query overall message status using message status capabilities Enables the CAD application to delete individual messages or purge all messages from the message queue Provides a message log Maintains table of CAD-IDs and Message-IDs Maintains a directory service used to determine the source of inbound Data Reports The Middleware performs the following functions:

Passes messages to the AIA

Passes non-messages (Data Reports) to the AIA

Uses NDNs and PDNs to update message status, and to generate service acknowledgments to AIA Provides MRNs, Time of Acceptance (TOA), and PDN information to AIA Logs (interface control block) ICB information and message contents from inbound and outbound messages in a file Compresses message data for delivery over the satellite network Handles message priority Provides end-to-end message delivery acknowledgment functionality The Communications Agent performs the following functions:

Interfaces with the LES

Provides direct X.25 access for X.121 addressed and immediately forwarded messages and Data Reports Provides DNID access for DNID addressed messages and Data Reports if Immediate Forwarding is turned off The key functionality of the CPG are as follows:
LES services utilized by the CPG for Phase 1
Messages
DNID Access
Data Reports
Inbound messages can be X.121, SAC, or DNID addressed
Outbound messages are addressed to a mobile-ID
Immediate Forwarding of DNID addressed messages and Data Reports can be turned on or off
Personnel will administer DNID numbers, and Data Reporting parameters (report frequency, DNID file destination)
Activation Terrestrial PDNs for all customers
CPG to LES interface supports direct X.25 connection
One LES per CPG
One PIN and Password per CPG
CPG will be a SUN Solaris platform
Customer LES access information (LES X.121 address, PIN, and Password) is part of configuration files on the CPG
The CPG supports FTP and Telnet utilities for network management communications Addressing and directory services within the satellite network are three separate but interrelated components: message level addressing, directory services, and address book functionality.

Message level addressing refers to information available with each packet which traverses the network. The information is encoded within the message header, and can be obtained at any node within the network either by looking directly at the ICB fields for a given message or by performing an function call.

Directory services refers to functionality present at each node which is used to direct messages between nodes on the network. It can also include functionality which fills in message level address information if it is not already present.

An address book is a collection of selected message level address, and directory service information which an be employed by an end application or presented to a user for the purpose of simplifying the process of selecting the destination for, or identifying the source of a given message.

Message level addressing information is carried with each message, and is obtained at each node. The significance of each of these fields for a given node depends on what connection method was chosen, and whether the current node is an end node or an intermediate node. This message level addressing strategy generally defines point to point communication (no intermediate nodes), but this addressing strategy carries all of the necessary information to allow additional hops to be introduced without changing the overall strategy. The introduction of multiple hops may require directory service information to be synchronized between intermediate nodes. Table 17 illustrates the fields used for addressing.

Directory Services at the CPG are generally limited to resolving the Mobile-ID from the DNID, Member Number, and LES combination for inbound GPS data reports. When a new customer is commissioned, a directory service file must be created which includes the Alias (or logical name), Mobile-ID (MET-ID) and its corresponding DNID/Member Number/LES-ID combinations so that Data Reports can be mapped to the appropriate mobile.

When a customer's account changes, this file must be updated, and the customer's CPG and AIA software must be updated to reflect the changes. When installing or replacing mobile equipment, the installing technician sends an installation EMS message to the CPG. The installation message itself is addressed to the CPG, and consumed by it for directory service purposes. The contents of this message include:

LES-ID
all DNID and Member Number combinations

The alias (logical name), and Mobile-ID (MET-ID) are passed to the CPG as well in the MES message header. The contents of the alias field depend on the customer specific configurations at the mobile. If the customer is configured with logon disabled, the alias will be the default mobile alias (typically the Truck-ID). If the customer is configured with logon enable, the alias of the installation message will be the alias of the technician performing the installation. Subsequent logon messages will be used to update the alias in the directory service table at the CPG.

Upon receipt of the installation message, the CPG updates its directory service with the new information by searching for a match between mobile-ID of the installation message and an existing entry in the Directory Service table. If there is a match, the new installation entry overwrites the existing one. If there is no match, a new entry is made. It is possible within this scenario that the table at the CPG includes entries for non-existent mobiles either because mobiles have been taken out of service, or because mobiles have been replaced by ones with a new DNID and Member Number combination.

Two messages are generally created by the CPG upon completion of a successful installation. One is a CAD logon message which is passed on to the CAD application for its use. The other is an installation successful message which is returned to the source mobile verifying that successful installation has occurred. If the installation was unsuccessful, a single installation unsuccessful message is created by the CPG and delivered to the source mobile. The installation and acknowledgment process ensures that the Mobile and CPG are synchronized, and Messaging can occur.

An Address Book is maintained by the CAD Application, on the CAD Application's platform. To send messages, the CAD provides the CPG the destination physical address, or Mobile-ID. The actual Address Book may contain many things, but at the very least it provides a cross reference between a given Mobile-ID and an Alias (possibly a truck number) which is used to refer to the truck in which a mobile is mounted.

Customer Premise Gateway Message Flow Processes

FIGS. 12–16 illustrate the detailed message flows through the CPG. For each message flow, a diagram illustrates the components involved and direction of data flow. There is a detailed description of each message flow broken down for each component in the CPG architecture. The message flows make reference to "message types" within the MMS network. Messages at both the middleware level and protocol level can be described by a type. The relationship, if one exists, between each middleware message type and the corresponding protocol message type is provided in Table 18.

Middleware Messages have different acknowledgment modes. Three modes are:
user level acknowledgment
application level acknowledgment
no acknowledgment Messages received with any other acknowledgment mode will be treated the same as a message received with acknowledgment mode set to none.

Figure 12:
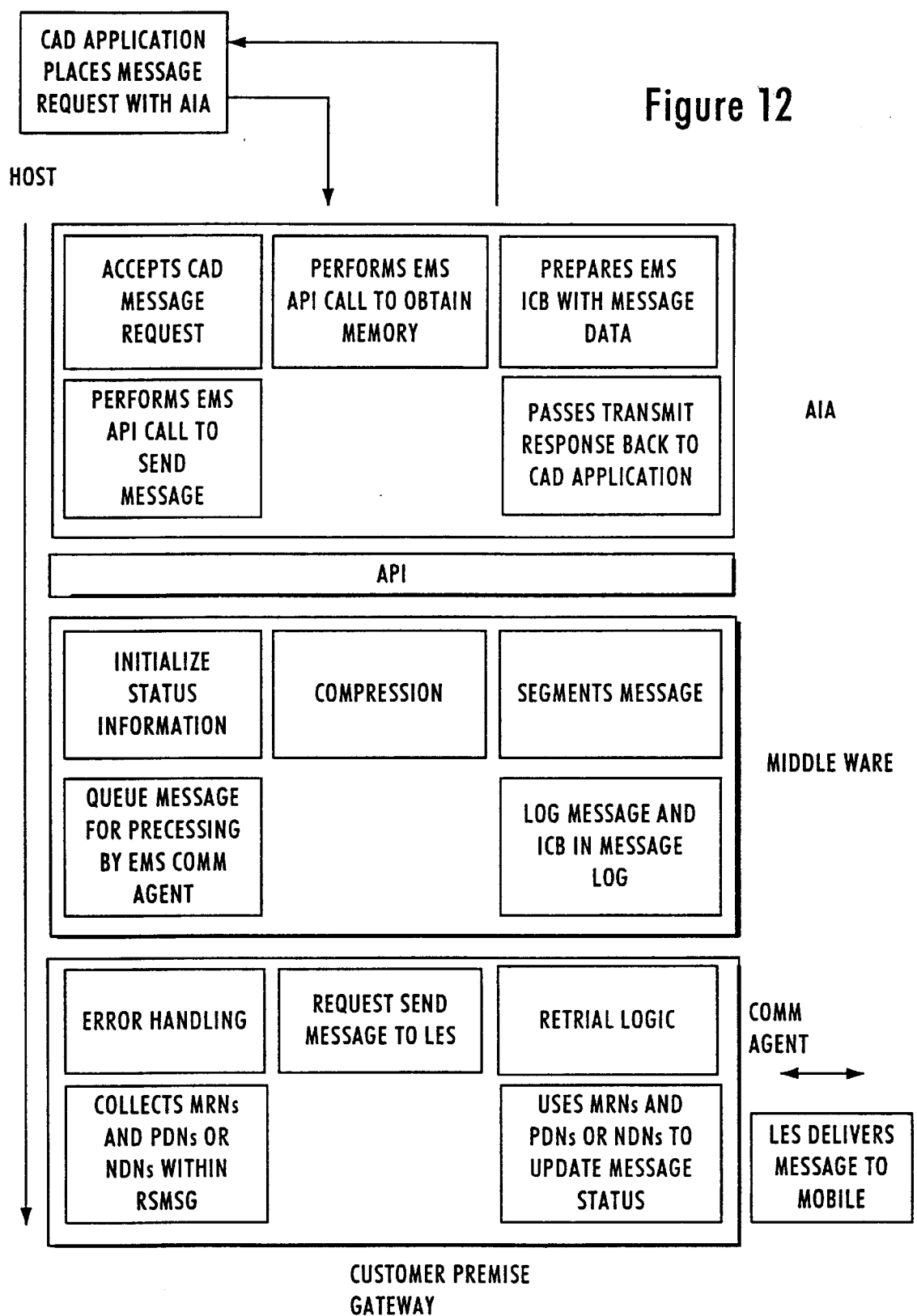
FIGS. 12–16 illustrate the detailed message flows through the CPG.

FIG. 12 illustrates the flow of a message transmitted from a terrestrial user. The CAD Application requests that messages be sent to mobiles via the AIA on the CPG. The physical destination address, or Mobile-ID, is required to deliver the message to the correct ultimate destination. To send a message from a terrestrial user to a mobile, the AIA performs the following functions:

accepts the CAD Application's formatted send message request performs the API call to obtain memory space for the ICB and message data and to get the Message-ID prepares the ICB and puts the message data in the defined memory location performs the API call to send the message to Middleware passes a transmit response back to the CAD Application to indicate that the send request was successful If an error occurs in processing the message, the AIA will pass an error code back to the CAD Application in response to the initial send request.

Once the message has been accepted by the API, middleware performs the following functions:

logs the message and ICB in the message log file initialize completion and reason codes which can be used for message status tracking segments the data (if necessary)

compresses the message data queues the message for processing by the communications agent The communications agent performs the following functions to send a message to the LES:

executes the appropriate LES message commands to send a message to the destination Mobile-ID performs retrial logic, if necessary, to ensure the message has been accepted by the LES interprets error conditions returned by the LES and handles the message and completion and reason codes appropriately The LES acknowledges acceptance of the message by providing a MRN and TOA. The LES then attempts to deliver the message to the Transceiver. When the message has been successfully delivered to the transceiver, the LES returns a PDN to the CPG. If the LES is unable to deliver the message to the Transceiver it may retry delivery of the message a number of times depending on the reason for initial failure. If the LES is still unable to deliver the message it returns an NDN to the CPG.

The information returned by the LES in response to a message submitted successfully is collected for all segments and returned to the AIA in the body of a message of type RSMSG. This is done only when all segments of a message have been accepted by the LES, and all network acknowledgments for those segments have been received. Individual MRNs, PDNs, and NDNs are not passed up at the CPG. They are collected and only delivered as part of the RSMSG as described above. The Message-ID of the RSMSG is the same as that of the original message.

If the message consists of one segment, the MRN, and PDN or NDN message is placed in the body of a message of type RSMSG and delivered to the AIA. If the acknowledgment mode of the original message was user or application, when the destination Mobile Application receives the message sent by the terrestrial user, it will generate an acknowledgment message which will be delivered back to the terrestrial user. The AIA handles this message, which is message type user or application acknowledgment, in the same way as it handles message type message with default acknowledgment mode of none. This process is specified in the Receive Message section.

Figure 13:
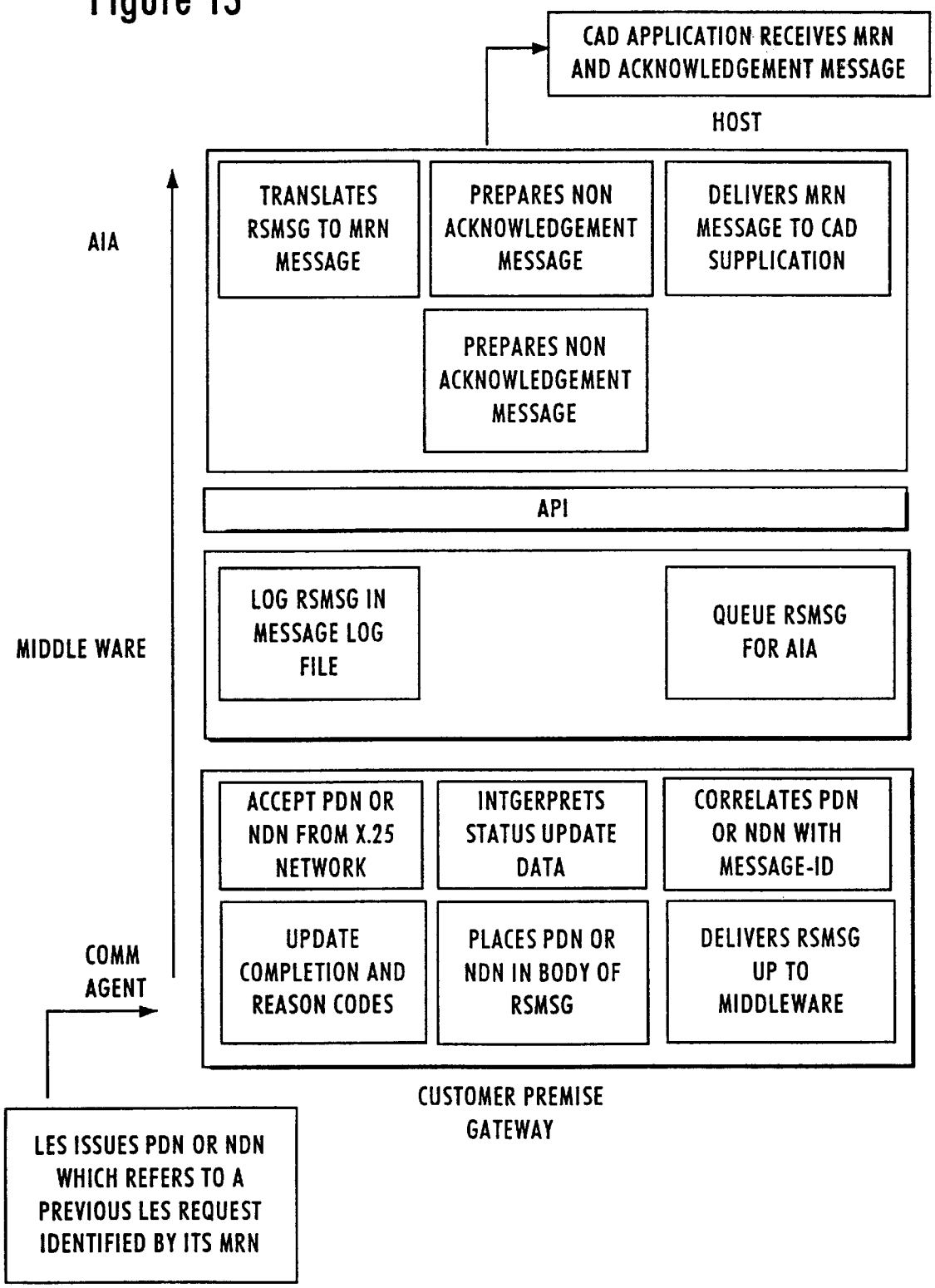

FIG. 13 illustrates the message flow for PDN or NDN messages. When a PDN is received by the communication agent it reacts in the following way:

accepts the incoming PDN from the X.25 network interprets the incoming data as a status update for the message identified by the MRN correlates the PDN with the appropriate Message-ID updates the completion and reason codes for the given message places the PDN message in the body of the RSMSG associated with the appropriate Message-ID if PDNs have been received for all segments of a message it delivers the completed RSMSG to EMS Middleware The Message-ID of the RSMSG is the same as the Message-ID of the original message.

The Middleware performs the following after receiving the RSMSG message:

logs the RSMSG message and ICB content in message log file queues the RSMSG message for retrieval by AIA If an NDN is received for a given message segment the communications agent performs the following:

accepts the incoming NDN from the X.25 network interprets the incoming data as a stats update for the message identified by the MRN correlates the NDN with the appropriate Message-ID updates completion and reason codes for the given message places data contained within the NDN message in the body of the RSMSG associated with the associated with Message-ID delivers the RSMSG to Middleware The Message-ID of the RSMSG is the same as that of the original messages. The completion status and reason codes of the RSMSG indicate that the message was unsuccessful and for what reason. The NDN itself is not passed up to the AIA at the CPG, but is passed up as part of the RSMSG for the entire message.

The Middleware performs the following after receipt of the RSMSG:

logs the RSMSG message and ICB contents in message log file queues the RSMSG message for retrieval by AIA The AIA passes a negative acknowledgment message to the CAD application indicating that the original message, identified by its CAD-ID failed, and for what reason.

Messages and data reports can be received by the CPG in several ways:

X.121 addressed message automatically forwarded, DNID addressed message automatically forwarded Data Reports DNID addressed message obtained through DNID access Data Reports obtained through DNID access In order to receive all types of data, the communications agent works in two ways. First, it accepts messages and Data Reports sent directly to, or forwarded to its X.121 address. Second, it periodically performs a DNID access request to retrieve the contents of its DNID files. Once data has been handled by the communications agent and passed up to the Middleware, the AIA cannot distinguish whether it was received directly or using DNID access.

Figure 14:
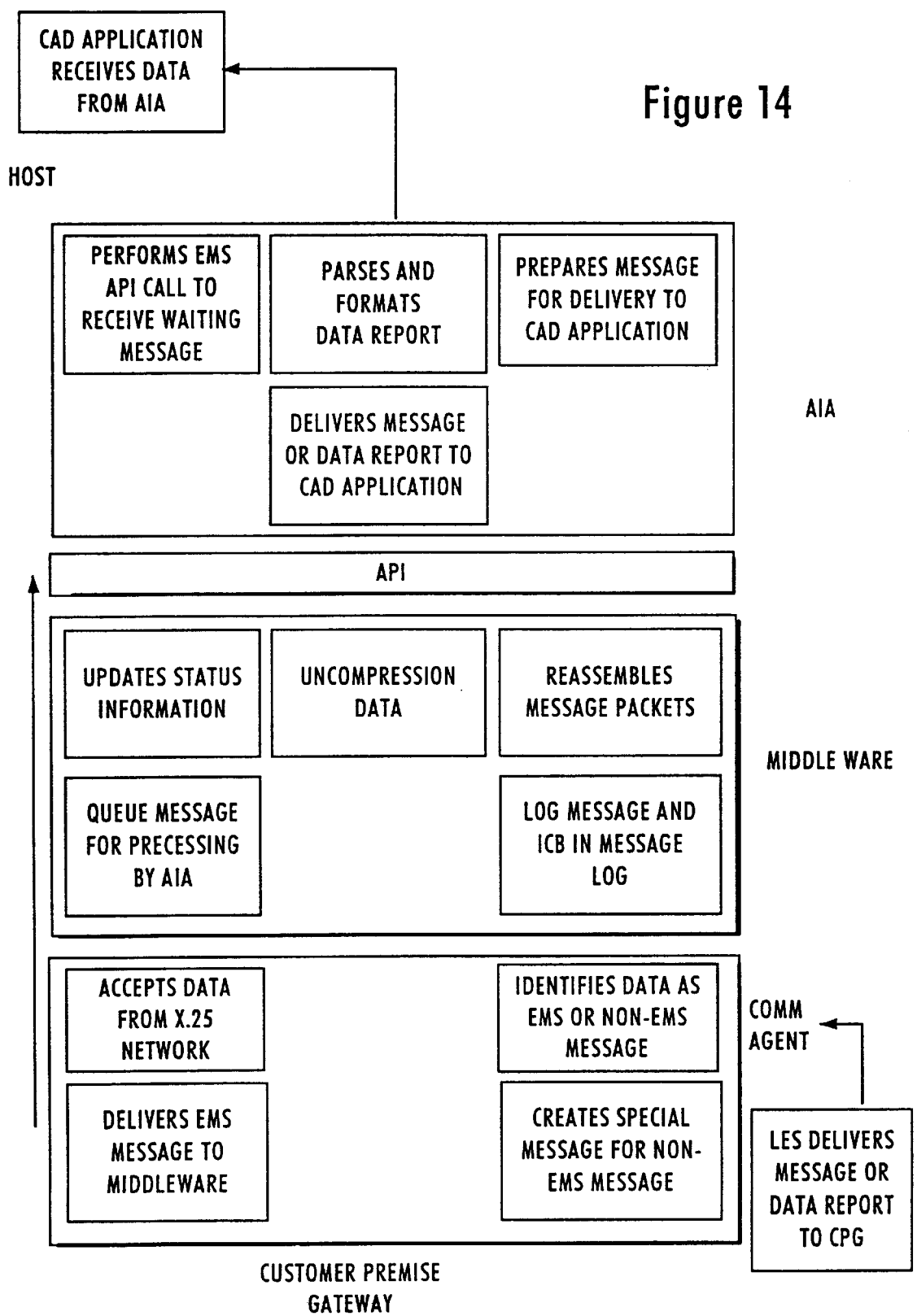

FIG. 14 illustrates X.121 addressed or automatically forwarded message flow. When the CPG receives data (MRN, PDN, and NDN are treated separately) directly from the LES, the communications agent performs the following:

accepts data from the X.24 network identifies the data as either a message, or non-message delivers messages to Middleware places non-message data into the body of a message of type DEVR and delivers to Middleware.

Non-message data which is not a PDN, NDN or MRN is passed up, as received over the X.25 interface without parsing or processing data contents, to the AIA as message type DEVR. There will be one non-message per DEVR message.

Figure 15:
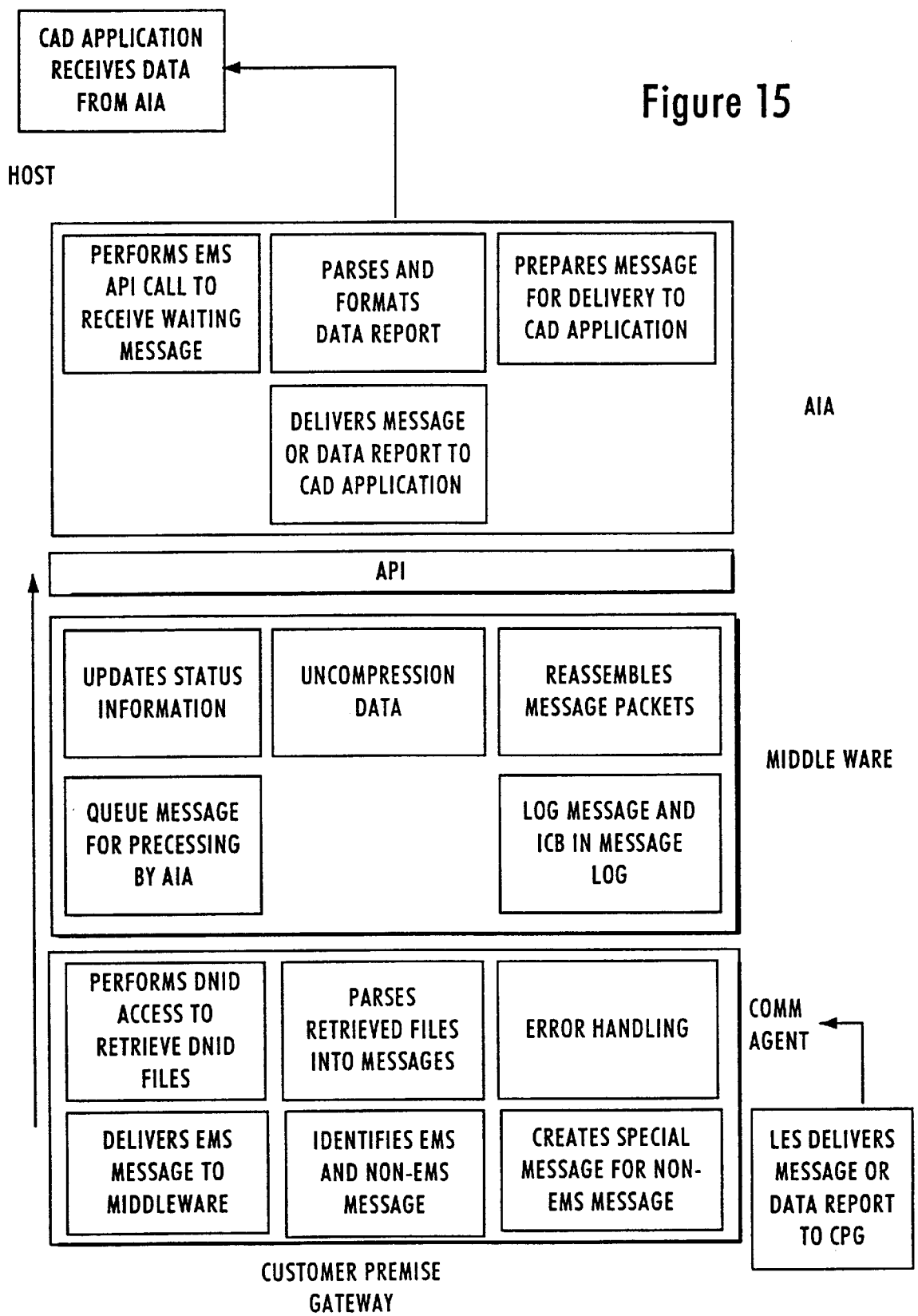

FIG. 15 illustrates a message flow of data being retrieved using a DNID. Messages and non-messages not delivered directly to the CPG must be retrieved using DNID Access. The comm agent periodically performs DNID access commands, with a frequency as specified in a configuration file. The communications agent performs the following:

performs the appropriate DNID access commands to retrieve all messages and Data Reports for the given customer reacts appropriately to errors returned by the LES parses the retrieved DNID file into individual messages or non-messages delivers messages to Middleware places non-message data into the message field of a message of type DEVR and delivers to the Middleware Non-message data will be passed up, as received from the DNID file without parsing or processing Non-message contents, to the AIA as message type DEVR. There will be one non-message per DEVR message.

The Middleware handles most inbound data in exactly the same way. The difference between types of data is evident in the message type field and acknowledgment mode field of the message ICB. When the Middleware receives a data from the communications agent it performs the following:

logs the message and ICB in the message log file updates completion and reason codes reassembles the data (if necessary)

uncompresses the message data queues message for processing by the AIA

The only exception to this handling occurs when the acknowledgment mode field of the ICB for a message indicates that an application acknowledgment has been requested by the sending mobile for this message. In this case, the Middleware will wait for the AIA to perform the commit command, and then format and deliver the Application acknowledgment message to the sending mobile.

As part of its normal processing, the AIA periodically performs the receive API call. When data is waiting to be received, it will be returned when this call is made. The AIA determines the message type and acknowledgment mode for the inbound data. The AIA handles messages of type MSG in different ways depending on whether the message is addressed to the CAD application or the CPG, and on what level of confirmation has been requested.

If the message is addressed to the CAD application, and the acknowledgment mode is none the AIA interprets the ICB, formats the CAD header, places message data in the message field of the CAD packet, and attempts to deliver the message to the CAD application. If the message is addressed to the CAD application, and the acknowledgment mode is application, the AIA interprets the ICB, formats the CAD header, places the message data in the message field of the CAD packet, and attempts to deliver the message to the CAD application. The AIA also performs the commit command for that inbound message so that the application acknowledgment message is created and sent back to the source of the original inbound message.

All messages of type MSG are identified as such in the message type field of the CAD header. If the message is addressed to the CPG, it is treated as an installation message. When acknowledgment messages are received at the CPG, the AIA interprets the ICB, formats the CAD header, and attempts to deliver the acknowledgment to the CAD application. Each different acknowledgment message is identified as such in the message type field of the CAD header.

The device response message contains a Data Report. When the AIA receives such a message it parses the report to determine what type of Data Report is present. If the Data Report is a land or maritime position report, the AIA formats the report and delivers it to the CAD Application. The data within the report includes the longitudinal and latitudinal coordinates of the vessel on which the mobile resides. It also contains the course and speed of maritime vessels.

If the Data Report is a logon or logoff report, the AIA re-formats it and delivers it to the CAD application. It contains the Mobile-ID and the spot beam on which the mobile is logged on.

The Router Service Message contains one of two types of information. It may contain the MRN, TOA, and PDN or NDN for each segment of a message sent to the LES, or it may contain an event code. When the AIA receives a RSMSG containing MRN, TOA, and PDN or NDN information it performs the functions described above. When the AIA received a RSMSG containing an event code, it re-formats the message, and delivers it to the CAD application.

Figure 16:
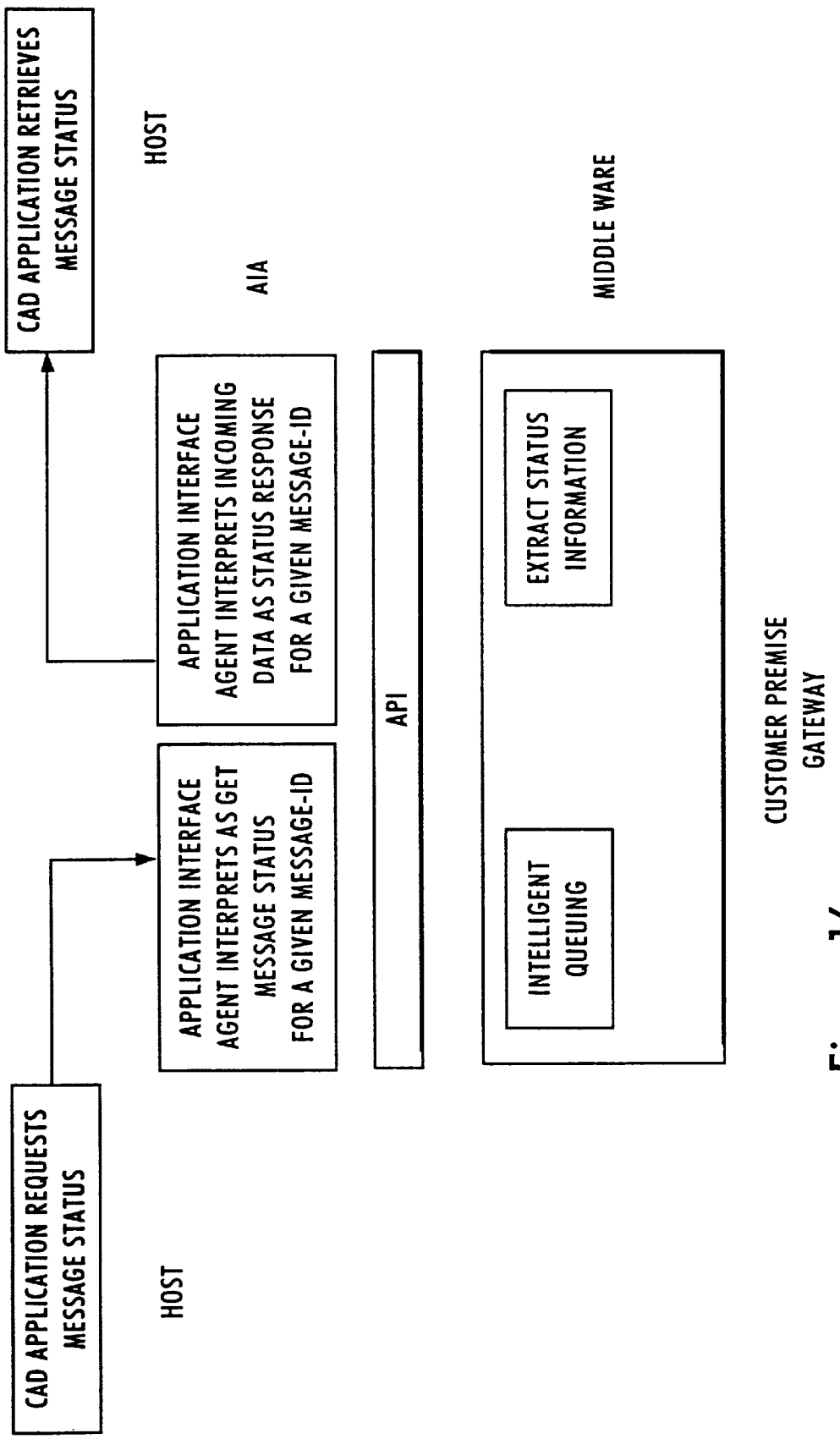

FIG. 16 illustrates the message flow for a status request message. The Status Request message allows the CAD Application on the Host to request the current status of a previously sent message. In order to initiate a Status Request, the CAD application indicates that status is requested in the message type filed, and provides the Message-ID of the original message in the CAD header.

The ALA performs the following when processing a status request:

retrieves CAD's formatted message status request performs API call to obtain memory space for the status request ICB prepares the ICB performs API call to request message status from Middleware passes the status information in the form of completion and reason codes back to the CAD Application Services provided by middleware are as follows:

extract message status information queue the status information for retrieval by the Application Interface Agent A Purge Request allows the CAD Application on the Host to purge all messages from the queue. In order to initiate a Purge Request, the CAD application indicates that a purge is requested in the message type field of the CAD header. The AIA performs the following when processing a purge request:

retrieves the CAD Application's formatted purge request performs the API call to purge the queue Services provided by middleware are as follows:

purge all messages from the message queue

Delete Request allows messages to be deleted from the queue based on their CAD-ID, or their destination physical address. In order to initiate a Delete Request, the CAD application indicates which type of delete (by CAD-ID or destination) is requested in the message type field of the CAD header, and the CAD-ID or destination Mobile-ID of the messages to be deleted.

The AIA performs the following when processing a delete request:

retrieves the CAD Application's formatted delete request resolves Message-ID of original message using the CAD-ID performs the API call to delete the message(s) for the given Message-ID, or destination Mobile-ID Services provided by middleware are as follows:

delete the appropriate messages from the EMS message queue.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

Appendix A

Appendix A describes the format and contents of the Local Messages exchanged between the MMS Communications Software and the End-System Application Software in the MMS system. These messages are used in communicating information between the two software systems that is not sent or received over the network.

All of these local messages incorporate the same header design as the MCS packet header used in messages transmitted over the network. This allows software design simplicity while imposing no performance loss since the messages are not sent over the network. Those fields in the MCS header which are not needed for local messages are set to null or zero values. Table A-1 defines the format of all Local Messages. Details for individual fields and the message body are given in the individual message descriptions.

TABLE A-1

Local Message Format

| Field # | Field Name | Max Size (Bytes) | Description |
|---|---|---|---|
| 1 | Format Indicator | 2 | Value: 0000000000000000 -- not necessary for local msgs |
| 2 | Flags | 2 | Value: 0000000000000000 -- not necessary for local msgs |
| 3 | Message Type[1] | 1 | Valid Values: Hex digit pair - different value defined for each local message |
| 4 | Priority | 0.5 | Valid Values: 0 - not currently needed for local messages |
| 5 | Ack Level | 0.5 | Valid Values: 0 -- not necessary for local msgs |
| 6 | Message Length | 2 | Length of the local message body - defined separately for each local message |
| 7-x | Local message specific fields | | See individual message definitions |

[1]Hex Values 80 - FF are reserved for local messages. 01 - 7F are reserved for MMS transmittable messages Command Message Sent by the end-system application to the communications software to provide a command for the attached communications device. Such commands are used for configuring/controlling the device. The command data format is device specific which the application software has to manage. The communications software merely accepts the data and passes it through to the device. Table A-1 defines the message format. The message specific fields will have the following values defined in Table A-2:

TABLE A-2

Command Message Format

| Message Type (field 3) | 80 (Hex value) |
|---|---|
| Message Length (field 6) | Integer value for length of command string in the message body |
| Message Body (field 7) | Command Information - Variable length binary string |

Comm Status Message

Sent by the communications software to the end-system to provide binary information received from the communications device. This information could be device responses to commands, "Events" detected by the device that have to be reported to the end-system, or general communications device status information. Table A-1 defines the message format. The message specific fields will have the following values defined in Table A-3:

TABLE A-3

Comm Status Message Format

| Message Type (field 3) | 81 (Hex value) |
|---|---|
| Message Length (field 6) | Integer value for length of the Device Info string in the message body |
| Message Body (field 7) | Device Information - Variable length binary string |

Message Status Message

Sent by the communications software to the end-system to provide status information for user messages exchanged via the MMS system. The user messages are referenced by the local message identifier. The status code indicates the status of the referenced message. If the status code is MRN, the message is providing the MRN returned by the LES for the message. Table A-1 defines the message format. The message specific fields will have the following values defined in Table A-4:

TABLE A-4

Message Status Message Format

| Message Type (field 3) | 82 (Hex value) |
|---|---|
| Message Length (field 6) | 17 |
| Message Body (fields 7–9) | Message Field 7:<br>    Local Message Reference ID -<br>        12 byte character string indicating the user message this status applies to. (Null terminated if less than 12 characters)<br>Message Field 8:<br>    MRN -<br>        4 byte Integer - Referenced Msg MRN if available - FFFFFFFF if unavailable<br>Message Field 9:<br>    Status Code -<br>        One of the following Hex Values:<br>            01 - LES MRN received<br>            02 - LES PDN received<br>            03 - LES NDN received<br>            04 - Cannot Xmit msg - Bad Msg Type<br>            05 - Cannot Xmit msg - Invalid Dest.<br>            06 - Message Queued<br>            07 - Message Transmitted<br>            08 - Message Failed |

Network Status Message

Sent by the communications software to the end-system to provide information about the status of the network. This message indicates whether or not the network is available for communications. Table A-1 defines the message format. The message specific fields will have the following values defined in Table A-5:

TABLE A-5

Network Status Message Format

| | |
|---|---|
| Message Type (field 3) | 83 (Hex value) |
| Message Length (field 6) | 1 (Integer value for length of message body) |
| Message Body (field 7) | Status Code - One of the following Hex Values:<br>01 - Healthy<br>02 - Failed |

Appendix B

Appendix B describes the contents of the MMS Communications Software packet header fields and format. The fields' numbers correspond to their sequence in the header. The communications software reading this header knows which fields are not present by reading which optional field flags in the Flags field are set. Note that the destination address fields are optional in this header because this defines the packet header that is transmitted and received over the network. For each message to be sent, the end-systems provide the destination address information to the communications software in parameters separate from this header.

ACRONYM DEFINITIONS

| | |
|---|---|
| AIA | Application Interface Agent<br>the software on the CPG that interfaces to the communications software and translates/reformats MCS data for use by the CAD applications |
| AMC | AMSC Mobile Communicator<br>all of the hardware and software installed in each mobile unit as part of the MMS service; includes DTE and DCE |
| API | Application Program Interface<br>the library of C language routines that provide an interface between user applications and the MMS Communications Software |
| CAD | Computer Aided Dispatch<br>the hardware and software system used at MMS customer sites by dispatchers for communicating with AMCs |
| CPG | Customer Premises Gateway<br>hardware and software installed at the MMS customer's site which provides gateway services to the X.25 Network for communicating with customer mobiles |
| CGA | Color Graphics Adapter<br>the type of graphics adapter and monitor included within the OMNIDATA DTE; it is implemented as a full screen LCD with 80 characters × 25 lines in text mode and 640 × 200 pixels in graphics mode |
| DCE | Data Communications Equipment<br>the transceiver and GPS receiver installed in each mobile unit |

| Field # | Field Name | Max Size (Bytes) | Resp. App.[1] | Optional (*) | Description |
|---|---|---|---|---|---|
| 1 | Format Indicator | 2 | CS | | Value: 0010010100101011 (binary % + representation). Indicates to receiver whether or not the incoming data stream is a MMS message |
| 2 | Flags | 2 | ES/CS | | Indicates which optional fields are present. Flag order corresponds to Optional Field Number sequence |
| 3 | Message Type[2] | 1 | ES | | Valid Values: Hex digit pair |
| 4 | Priority | 0.5 | ES | | Valid Values: 0–9 |
| 5 | Ack Level | 0.5 | ES | | Valid Values: 0, 1 |
| 6 | Message Length | 2 | ES | | Length of the application message portion of the packet |
| 7 | Source Address Alias | 9 | ES | * | Variable Size -- Null Terminated if less than 9 chars. |
| 8 | Source Address Type[3] | 1 | ES | * | If field 9 contains data, field 8 must also |
| 9 | Source Address Value[3] | 15 | ES | * | Variable Size -- Null Terminated |
| 10 | Destination Address Alias | 9 | ES | * | Variable Size -- Null Terminated if less than 9 chars. |
| 11 | Destination Address Type[4] | 1 | ES | * | Field 12 values are dependent on the content of this field |
| 12 | Dest Address Value[4] | 15 | ES | * | Variable Size -- Null Terminated |
| 13 | Future[5] | | CS | * | Extra Field for future capabilities |

[1] Application primarily responsible for putting the data in the header - (ES) End System Application or (CS) Communications Software
[2] Hex Values 01 - 7F are reserved for MMS transmittable messages. 80 - FF are reserved for local messages defined in Appendix C.
[3] There is only one flag used to indicate the presence of both the Source Address Type and Source Address Value fields since there cannot be one field without the other.
[4] There is only one flag used to indicate the presence of both the Destination Address Type and Destination Address Value fields since there cannot be one field without the other.
[5] Future Header fields which will eventually allow for enhanced capabilities such as user message acknowledgment, segmentation, encryption, etc.

-continued

ACRONYM DEFINITIONS

| | |
|---|---|
| DML | Data Message Log |
| | the log into which all data messages are placed upon receipt at the AMC or transmission from the AMC |
| DNID | Data Network Identifier |
| | the 'Mailbox' within the Land Earth Station to which AMC messages can be directed |
| DTE | Data Terminal Equipment |
| | the keyboard/screen operated by the AMC user of the MMS |
| EMS | Enterprise Messaging Services |
| | the middleware product integrated with the AMC application software that provides all lower-level network transport services |
| ENID | Enhanced Group Call (EGC) Network Identifier |
| | an identifier to which messages can be broadcast from the LES; all DCEs that have previously been configured with this ENID will receive the message |
| EGC | Enhanced Group Call |
| | the service provided by AMSC's satellite network that allows a message to be sent from the terrestrial customer site to multiple mobiles with one send action |
| ES | End System |
| | a user system that requires access to AMSC's network via the communications software |
| GPS | Global Positioning System |
| | the satellite system used by the DCE to determine the location of the DCE |
| IML | Incoming Message Log |
| | the log into which all user messages are placed upon arrival at the AMC |
| LCD | Liquid Crystal Display |
| | the type of monitor included on the OMNIDATA; used for all displays of text and graphics information to the AMC user |
| LED | Light Emitting Diode |
| | the visual indicators on the OMNIDATA used to provide state information to the user |
| LES | Land Earth Station |
| | the ground station that dispatches messages between the satellite network and terrestrial networks according to the above-described enhanced satellite communications protocol. |
| MCS | MMS Communications Software |
| | the software that provides the lower level network transport services to the End-Systems communicating with each other via AMSC's Mobile Messaging Service |
| MMS | Mobile Messaging Service |
| | the name of the AMSC service that supports communications between the Customer's CAD applications and the Mobile AMCs |
| MDF | Menu Definition File |
| | the DTE configuration file that specifies the organization of the functions within the DTE's menus |
| MMS | Mobile Messaging Service |
| | the service that is supported by the AMC |
| MRN | Message Reference Number |
| | the unique number returned to the AMC by the Land Earth Station (LES) when the LES receives a message packet transmitted from the AMC using normal messaging services (note that there may be a list of MRNs/PDNs/NDNs returned to the AMC for each message since the middleware software segments messages and transmits them as multiple satellite messages) |
| MSAT | Mobile Satellite |
| | the satellite that supports the MMS. |
| NDN | Negative Delivery Notification |
| | a message acknowledgement indicating that the LES was not able to deliver a message to its destination, preferably transmitted according to the enhanced satellite communications protocol. |
| NML | Network Message Log |
| | the log into which all network messages are placed upon receipt at the AMC or transmission from AMC |

-continued

ACRONYM DEFINITIONS

| | |
|---|---|
| OML | Outgoing Message Log |
| | the log into which all user messages are placed upon transmission from the AMC |
| PCMCIA | Personal Computer Memory Card International Assoc. |
| | a standard that specifies the type of one of the peripherals connected to the DTE |
| PDN | Positive Delivery Notification |
| | a message acknowledgement in the enhanced satellite communications protocol indicating that the LES was able to send a message to its destination |
| PIN | Personal Identification Number |
| | the individual identifier assigned to customers required for accessing the customer account on LES |
| PVT | Performance Verification Test |
| | a test executed within the DCE to determine whether or not it is functioning properly |
| RAM | Random Access Memory |
| | memory that can be read and updated by the software; on an MET OMNIData, the RAM disk serves as the Read/Write disk drive used by the software |
| ROM | Read Only Memory |
| | memory that can only be read by the software |
| SAC | Special Access Code |
| | an address type within the LES to which AMC messages can be addressed |
| SML | Saved Message Log |
| | the log into which users can place incoming messages that they want to save; these messages will only be deleted from the AMC at the request of the user |
| SRAM | Static RAM |
| | a type of 'card' that can be inserted into the DTE's PC-MCIA slot and used as a read-write disk |
| TTY | Teletypewriter |
| | a low speed asynchronous communications protocol with limited or no error checking |
| UTC | Universal Time Coordinate |
| | the Universal Coordinated Time system used for maintaining all times internal to the AMC and for sending all messages to and from the AMC |
| X.121 | |
| | the protocol for addresses used within an X.25 packet data network; messages sent from the AMC can be directed to one of these addresses |

Terms

Activation Log-On Message

The Mobile Earth Station sends an Activation Log-On Message to the CPG indicating that the MES software installation is complete. This type of message contains the LES ID, the DID and Member Number combinations, the alias (logical name), and the Mobile-ID. The CPG uses this information to update or add to the directory services table and generates a response indicating the success or failure of the Activation Log-On Message. The CAD can specify whether or not they prefer to receive this type of message.

Application Acknowledgment

A special message type that can be generated by a destination application following receipt and storage of a message with acknowledgment mode set to application acknowledgment. The remote EMS application generates an Application Acknowledgment upon receiving a message requiring an application confirmation.

CAD-ID

A message tracking number created by the CAD application and used when requesting message status and message deletion.

Data Message

Data messages are those messages that are exchanged between the AMC software and a workstation at the dispatcher's site. These messages are not initiated by AMC users and do not require the AMC user's involvement. Conceptually, they are somewhat similar to network messages, but they are used for exchanging 'customer data' between the AMC and the dispatcher's site. They are used by the dispatcher to download the DTE configuration data that AMSC allows the dispatcher to change (e.g., proformas, address books, DTE parameters) and they are used by the AMC to automatically send customer data to the dispatcher site (e.g., engine monitoring data, bar code reader data). Their format may be either fixed or based on a proforma definition file. If based on a proforma definition file, the file may contain commands or automatic data variables, but not both and not display variables; replies, if required, must be automatic (not manual) and the reply proforma must also be a data proforma. The AMC software (not the user) may initiate these messages as the result of some triggering event (e.g., engine monitor reports engine data, data is received from bar code reader).

Delete Command

A Delete Command tells the CPG to delete pending Outbound Messages by message ID or by physical destination. This message does not produce any satellite traffic.

End System

A user system that requires access to the network via the communications software. An End System contains the application processes that are the ultimate sources and destinations of user-oriented message flows.

Event Message

The CPG receives events that the LES generates. The Event Message contains an event number corresponding to the state of the LES. The CPG send this Event Message to the CAD Application.

Fixed-Format Message a message whose format and contents are predetermined and are built into the software; all messages are either fixed-format messages or proforma messages.

GPS (Global Position) Message

The transceiver of the Mobile Earth Station sends a GPS report to the CPG indicating the position of a truck or a sea vessel. The CPG formats this report and sends it to the CAD. This type of message contains the longitudinal and latitudinal coordinates of the vessel on which the MES resides. The message may also contain the speed and course of maritime vessels.

Inbound Message

The Mobile Earth Station sends a message inbound to the CPG. An Inbound Message contains either a fixed format message or a proforma.

Local Message a message that is communicated between the DTE and the DCE to configure the DCE, command the DCE to perform an action, query the DCE for information, return the results of a DCE command to the DTE or report a DCE event to the DTE; these messages are not transmitted over the network Logical Log-On Message The Mobile Earth Station sends a Log-On Message inbound to the CPG. The Log-On Message contains a logical name, application name, and physical address. The CPG then associates the logical name and application name to the physical address.

Logical Log-Off Message

The Mobile Earth Station sends a Log-Off Message inbound to the CPG. The Log-Off Message contains a logical name, application name, and physical address. The CPG then disassociates the logical name and application name with the physical address.

Message-ID

A message tracking number provided by middleware for use in message status tracking and deletion.

Middleware

The software integrated with the AMC application software that provides all lower-level network transport services. The middleware isolates user application developers from lower level network transport considerations.

MRN Message

The CPG creates an MRN Message for every outbound message originating at the CAD application. This message contains information that cross references an identification number with the success or failure of each message. The CPG receives this message from the LES and forwards it to the CAD Application.

Neg-Acknowledgment

A Neg-Acknowledgment is a non-delivery notification that the CPG generates when a message either fails to be queued at the CPG or fails anywhere between the CPG and the destination application.

Network Message messages that are exchanged between the AMC software and a network management station, located for example at a dispatcher site. These messages are used to control and report the state of the mobile network service (i.e., the DTE and the DCE). They are not initiated by AMC users and do not require the AMC user's involvement. Conceptually, they are used for troubleshooting the DTE and DCE and for changing those configuration parameters within the DTE and DCE that the satellite communications system wants to control, as opposed to allowing the dispatcher to control them. Their format may be either fixed or based on a proforma definition file. If based on a proforma definition file, the file may contain commands or automatic data variables, but not both and not display variables; replies, if required, must be automatic (not manual) and the reply proforma must also be a network proforma. The AMC software (not the user) may initiate these messages as the result of some triggering event (e.g., periodic health report timer expires, incoming network message contains a command that requires an outgoing network message to be sent).

Outbound Message

The CAD application sends a message to the CPG. The CPG then sends the message outbound to a Mobile Earth Station. The Outbound Message may contain a fixed format message or a proforma.

Proforma Message a message whose format and contents are determined by a message proforma; the exact format and content of these messages are not built into the software; all messages are either fixed-format messages or proforma messages Purge Command A Purge Command tells the CPG to purge all pending messages outbound or inbound regardless of their state.

This command is destructive and should be used very sparingly. This message does not produce any satellite traffic.

Satellite Long-On/Log-Off Message

The transceiver of the Mobile Earth Station sends Satellite Long-On/Log-Off Data Reports to the CPG indicating that the MES is turned on (Log-On) or turned off (Log-Off). If the MES is turned on, the Log-On Message contains the spot beam on which the MES is communicating.

Status Request

A status Request from the CAD application is a request that tells the CPG to check the status of a previous Outbound Message. This message does not produce any satellite traffic.

Transmit Response

A Transmit Response message is a message that the CPG creates after it successfully queues an Outbound Message or executes a command or request. The CPG generates a message containing a field to indicate the type of message, command, or request to which the response corresponds. The message also contains the message id, status code, and reason code associated with the original message, command or request.

User Acknowledgment

A special message type that can be generated by a destination application following receipt and user action upon a message with acknowledgment mode set to user acknowledgment. The remote EMS or middleware application generates a User Acknowledgment when the user receives a message requiring user confirmation.

User Message messages that an MMS mobile user and an MMS terrestrial user exchange with one another. They may include data automatically included in the message by the software (automatic data variables), but they are only sent at the request of a user. They may not command the AMC unit to perform some action (i.e., they may not include commands in their proforma definition files). Their format is always based on a proforma definition file.

What is claimed is:

1. In a mobile satellite system including a satellite communication switching office having a satellite antenna for providing communication of satellite messages with a mobile communication system via a satellite, a central controller communicating with the mobile communication system via the satellite communication switching office, and a computer aided dispatch (CAD) system sending and receiving customer messages to/from the mobile satellite system via a customer premises gateway system, the customer premises gateway system comprising:

a middleware service provider supporting central controller communication services, satellite message communication services, and network management communication services, said middleware service provider configuring middleware services for invocation;

an Application Interface Agent (AIA) receiving outbound messages from the CAD system, and formatting the outbound messages as application programmer interface (API) calls to the middleware service provider, said AIA receiving inbound messages from the middleware service provider, interpreting the inbound messages, and delivering the inbound messages to the CAD system;

an application programmer interface (API) including a library of middleware functions and the API calls to invoke the middleware services of said middleware service provider;

a network manager performing message logging provided by said middleware service provider including logging control information for messages handled by said middleware service provider;

a communications driver including a communication protocol to interface with a physical transport medium of the CAD system; and a central controller interface providing an interface between the CAD system and the central controller and providing the CAD system access to the mobile satellite system.

2. A customer premises gateway system according to claim 1, wherein said AIA further performing the functions:

(1) interfacing with the CAD system, (2) receiving the outbound messages from the CAD system and translating the outbound messages into the API calls, (3) retrieving the inbound messages from the central controller and transmitting the inbound messages to the CAD system, (4) interpreting non-messages including data reports, (5) enabling the CAD system to query network message status using message status capabilities, (6) enabling the CAD system to delete individual messages or purge the inbound and outbound messages from a message queue, (7) providing a message log, (8) maintaining a table of CAD-IDs and Message-IDs, and (9) maintaining a directory service used to determine a source of inbound data reports.

3. A customer premises gateway system according to claim 1, wherein said middleware service provider further performing the following functions:

(1) transmitting the inbound messages to said AIA, (2) transmitting non-messages including data reports to said AIA, (3) using Negative Delivery Notifications (NDNs) and Positive Delivery Notifications (PDNs) to update message status, and to generate service acknowledgments to said AIA, (4) transmitting Message Reference Number (MRN), Time of Acceptance (TOA), and PDN information to said AIA, (5) logging Interface Control Block (ICB) information and message contents from the inbound and outbound messages in a file, (6) compressing the outbound messages for delivery over the mobile satellite system, (7) assigning message priority to the outbound messages, (8) providing end-to-end message delivery acknowledgment functionality.

4. A customer premises gateway system according to claim 1, wherein said communications driver further performing the following functions:

(1) interfacing with the central controller, (2) providing direct X.25 access for X.121 addressed messages, immediately forwarded messages, and data reports, and (3) providing Data Network Identifier (DNID) access for DNID addressed messages and the data reports when immediate forwarding is inactive.

5. In a mobile satellite system including a satellite communication switching office having a satellite antenna for providing communication of satellite messages with a mobile communication system via a satellite, a central controller communicating with the mobile communication system via the satellite communication switching office, and a computer aided dispatch (CAD) system sending and receiving customer messages to/from the mobile satellite system via a customer premises gateway system, a method of managing and transmitting the customer messages between the CAD system and the mobile satellite system comprising the steps of:

(a) supporting central controller communication services, satellite message communication services, and network management communication services, (b) configuring middleware services for invocation;

(c) receiving outbound messages from the CAD system, and formatting the outbound messages as application programmer interface (API) calls, (d) receiving inbound messages, interpreting the inbound messages, and delivering the inbound messages to the CAD system;

(e) invoking the middleware services via a library of middleware functions and the API calls;

(f) performing message logging including logging control information;

(g) interfacing with a physical transport medium of the CAD system;

(h) providing an interface between the CAD system and the central controller and providing the CAD system access to the mobile satellite system; and (i) configuring access information for accessing the central controller.

6. A mobile satellite system including a satellite communication switching office having a satellite antenna for providing communication of satellite messages via a satellite, the mobile satellite system comprising:

a mobile communication system transmitting to and receiving messages from the mobile satellite system;

a computer aided dispatch (CAD) system sending to and receiving customer messages from said mobile communication system via the mobile satellite system;

a central controller controlling communication in the mobile satellite system;

a customer premises gateway (CPG) system providing an interface between said CAD system and said central controller, enabling the mobile communication system to transmit the messages to said CAD system and enabling said CAD system to transmit the customer messages to the mobile communication system.

7. A mobile satellite system according to claim 6, wherein said CPG system includes a CPG application and CPG middleware, and said mobile communication system includes a mobile application and mobile middleware, wherein the CPG and mobile applications implement message generation and message presentation, and wherein the CPG and mobile middleware implement message transmission and reception.

8. A mobile satellite system according to claim 6, wherein said CPG system performing the following functions:

supporting central controller communication services, satellite message communication services, and network management communication services, configuring middleware services for invocation;

receiving outbound messages from the CAD system, and formatting the outbound messages as application programmer interface (API) calls, receiving inbound messages, interpreting the inbound messages, and delivering the inbound messages to the CAD system;

invoking the middleware services via a library of middleware functions and the API calls;

performing message logging including logging control information;

interfacing with a physical transport medium of the CAD system;

providing an interface between the CAD system and the central controller and providing the CAD system access to the mobile satellite system; and configuring access information for accessing the central controller.

9. A mobile satellite system according to claim 6, wherein said CPG system comprises:

a middleware service provider supporting central controller communication services, satellite message communication services, and network management communication services, said middleware service provider configuring middleware services for invocation;

an Application Interface Agent (AIA) receiving outbound messages from the CAD system, and formatting the outbound messages as application programmer interface (API) calls to the middleware service provider, said AIA receiving inbound messages from the middleware service provider, interpreting the inbound messages, and delivering the inbound messages to the CAD system;

an application programmer interface (API) including a library of middleware functions and the API calls to invoke the middleware services of said middleware service provider;

a network manager performing message logging provided by said middleware service provider including logging control information for messages handled by said middleware service provider;

a communications driver including a communication protocol to interface with a physical transport medium of the CAD system; and a central controller interface providing an interface between the CAD system and the central controller and providing the CAD system access to the mobile satellite system.

10. A customer premises gateway system according to claim 9, wherein said AIA further performing the functions:

(1) interfacing with the CAD system, (2) receiving the outbound messages from the CAD system and translating the outbound messages into the API calls, (3) retrieving the inbound messages from the central controller and transmitting the inbound messages to the CAD system, (4) interpreting non-messages including data reports, (5) enabling the CAD system to query network message status using message status capabilities, (6) enabling the CAD system to delete individual messages or purge the inbound and outbound messages from a message queue, (7) providing a message log, (8) maintaining a table of CAD-IDs and Message-IDs, and (9) maintaining a directory service used to determine a source of inbound data reports.

11. A customer premises gateway system according to claim 9, wherein said middleware service provider further performing the following functions:

(1) transmitting the inbound messages to said AIA,
(2) transmitting non-messages including data reports to said AIA,
(3) using Negative Delivery Notifications (NDNs) and Positive Delivery Notifications (PDNs) to update message status, and to generate service acknowledgments to said AIA,
(4) transmitting Message Reference Number (MRN), Time of Acceptance (TOA), and PDN information to said AIA,
(5) logging Interface Control Block (ICB) information and message contents from the inbound and outbound messages in a file,
(6) compressing the outbound messages for delivery over the mobile satellite system,
(7) assigning message priority to the outbound messages,
(8) providing end-to-end message delivery acknowledgment functionality.

12. A customer premises gateway system according to claim 9, wherein said communications driver further performing the following functions:
   (1) interfacing with the central controller,
   (2) providing direct X.25 access for X.121 addressed messages, immediately forwarded messages, and data reports, and
   (3) providing Data Network Identifier (DNID) access for DNID addressed messages and the data reports when immediate forwarding is inactive.

13. In a mobile satellite system including a satellite communication switching office having a satellite antenna for providing communication of satellite messages with a mobile communication system via a satellite, a central controller communicating with the mobile communication system via the satellite communication switching office, and a computer aided dispatch (CAD) system sending and receiving customer messages to/from the mobile satellite system via a customer premises gateway system, the customer premises gateway system comprising:
   a middleware service provider supporting central controller communication services, satellite message communication services, and network management communication services, said middleware service provider configuring middleware services for invocation;
   an Application Interface Agent (AIA) receiving outbound messages from the CAD system, and formatting the outbound messages as application programmer interface (API) calls to the middleware service provider, said AIA receiving inbound messages from the middleware service provider, interpreting the inbound messages, and delivering the inbound messages to the CAD system;
   an application programmer interface (API) including a library of middleware functions and the API calls to invoke the middleware services of said middleware service provider;
   a network manager performing message logging provided by said middleware service provider including logging control information for messages handled by said middleware service provider;
   a communications driver including a communication protocol to interface with a physical transport medium of the CAD system; and
   a central controller interface providing an interface between the CAD system and the central controller and providing the CAD system access to the mobile satellite system,
   wherein said AIA further performing the functions:
      (1) interfacing with the CAD system,
      (2) receiving the outbound messages from the CAD system and translating the outbound messages into the API calls,
      (3) retrieving the inbound messages from the central controller and transmitting the inbound messages to the CAD system,
      (4) interpreting non-messages including data reports,
      (5) enabling the CAD system to query network message status using message status capabilities,
      (6) enabling the CAD system to delete individual messages or purge the inbound and outbound messages from a message queue,
      (7) providing a message log,
      (8) maintaining a table of CAD-IDs and Message-IDs, and
      (9) maintaining a directory service used to determine a source of inbound data reports,
   wherein said middleware service provider further performing the following functions:
      (1) transmitting the inbound messages to said AIA,
      (2) transmitting non-messages including data reports to said AIA,
      (3) using Negative Delivery Notifications (NDNs) and Positive Delivery Notifications (PDNs) to update message status, and to generate service acknowledgments to said AIA,
      (4) transmitting Message Reference Number (MRN), Time of Acceptance (TOA), and PDN information to said AIA,
      (5) logging Interface Control Block (ICB) information and message contents from the inbound and outbound messages in a file,
      (6) compressing the outbound messages for delivery over the mobile satellite system,
      (7) assigning message priority to the outbound messages,
      (8) providing end-to-end message delivery acknowledgment functionality,
   wherein said communications driver further performing the following functions:
      (1) interfacing with the central controller,
      (2) providing direct X.25 access for X.121 addressed messages, immediately forwarded messages, and data reports, and
      (3) providing Data Network Identifier (DNID) access for DNID addressed messages and the data reports when immediate forwarding is inactive.

14. A communication network including a communication switching office for providing communication of messages, the communication network comprising:
   a mobile communication system transmitting to and receiving messages from the communication network;
   a computer aided dispatch (CAD) system sending to and receiving customer messages from said mobile communication system via the communication network;
   a central controller controlling communication in the communication network;
   a customer premises gateway (CPG) system providing an interface between said CAD system and said central controller, enabling the mobile communication system to transmit the messages to said CAD system and enabling said CAD system to transmit the customer messages to the mobile communication system.

15. In a mobile satellite system, a central controller, and a computer aided dispatch (CAD) system sending and receiving customer messages to/from the mobile satellite system via a customer premises gateway system, the customer premises gateway system comprising:

a middleware services provider configuring middleware services;

an Application Interface Agent (AIA) receiving outbound messages from the CAD system, and formatting the outbound messages to the middleware service provider, said AIA receiving inbound messages from the middleware service provider and delivering the inbound messages to the CAD system;

an application programmer interface (API) invoking the middleware services of said middleware service provider;

a network manager performing message logging for messages handled by said middleware service provider;

a communication driver including a communication protocol to interface with a physical transport medium of the CAD system; and a central controller interface providing an interface between the CAD system and the central controller and providing the CAD system access to the mobile satellite system.

* * * * *